US011523556B2

United States Patent
Johnson et al.

(10) Patent No.: US 11,523,556 B2
(45) Date of Patent: Dec. 13, 2022

(54) PARTICLE DELIVERY SYSTEM OF AN AGRICULTURAL ROW UNIT

(71) Applicant: CNH Industrial America LLC, New Holland, PA (US)

(72) Inventors: Chad Michael Johnson, Arlington Heights, IL (US); Brian John Anderson, Yorkville, IL (US); Trevor Philip Stanhope, Oak Lawn, IL (US); Christopher Schoeny, Minooka, IL (US); Kregg Jerome Raducha, Oak Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 346 days.

(21) Appl. No.: 16/726,598

(22) Filed: Dec. 24, 2019

(65) Prior Publication Data
US 2021/0185900 A1 Jun. 24, 2021

(51) Int. Cl.
*A01C 7/20* (2006.01)
*A01C 7/04* (2006.01)

(52) U.S. Cl.
CPC .............. *A01C 7/20* (2013.01); *A01C 7/046* (2013.01)

(58) Field of Classification Search
CPC .. A01C 7/20; A01C 7/00; A01C 7/046; A01C 7/044; A01C 7/042; A01C 7/04
See application file for complete search history.

(56) References Cited

U.S. PATENT DOCUMENTS

| 222,042 A | 11/1879 | Haworth |
| 285,413 A | 9/1883 | Johnson |
| 716,408 A | 12/1902 | Graham |
| 2,646,191 A | 7/1953 | Wechsler |
| 2,852,995 A | 9/1958 | Domries |
| 3,176,636 A | 4/1965 | Wilcox et al. |
| 3,343,507 A | 9/1967 | Smith |

(Continued)

FOREIGN PATENT DOCUMENTS

| AU | 2012201380 A1 | 3/2012 |
| BR | 122012026494 B1 | 4/2016 |

(Continued)

OTHER PUBLICATIONS

Precision Planting, PrecisionMeter a Better Finger Meter, Improve Planter Performance Where it Counts—In the Meter, https://precisionplanting.com/products/product/precisionmeter, Feb. 14, 2019, 8 pages.

(Continued)

*Primary Examiner* — Christopher J. Novosad
(74) *Attorney, Agent, or Firm* — Rebecca Henkel; Rickard DeMille

(57) ABSTRACT

A particle delivery system of an agricultural row unit includes a first particle belt configured to receive a particle from a particle metering and singulation unit, a second particle belt configured to receive the particle from the first particle belt and to expel the particle to a trench in soil, and a particle transfer assembly configured to facilitate transfer of the particle from the first particle belt to the second particle belt. The first particle belt is configured to accelerate the particle to a target particle transfer speed, and the second particle belt is configured to accelerate the particle to a target particle exit speed greater than the target particle transfer speed.

12 Claims, 10 Drawing Sheets

(56) References Cited

U.S. PATENT DOCUMENTS

| | | |
|---|---|---|
| 3,561,380 A | 2/1971 | Adams, Jr. et al. |
| 3,627,050 A | 12/1971 | Hansen et al. |
| 3,659,746 A | 5/1972 | Winslow |
| 3,913,503 A | 10/1975 | Becker |
| 4,023,509 A | 5/1977 | Hanson |
| 4,026,437 A | 5/1977 | Biddle |
| 4,029,235 A | 6/1977 | Grataloup |
| 4,094,444 A | 6/1978 | Willis |
| 4,600,122 A | 7/1986 | Lundie et al. |
| 4,628,841 A | 12/1986 | Powilleit |
| 4,928,607 A | 5/1990 | Luigi et al. |
| 5,231,940 A | 8/1993 | Tjeerdsma |
| 5,842,428 A | 12/1998 | Stufflebeam et al. |
| 5,938,071 A | 8/1999 | Sauder |
| 5,992,338 A | 11/1999 | Romans |
| 6,192,813 B1 | 2/2001 | Memory et al. |
| 6,237,514 B1 | 5/2001 | Romans |
| 6,269,758 B1 | 8/2001 | Sauder |
| 6,283,051 B1 | 9/2001 | Yoss |
| 6,332,413 B1 | 12/2001 | Stufflebeanm et al. |
| 6,564,729 B1 | 5/2003 | Petzoldt |
| 6,564,730 B2 | 5/2003 | Crabb et al. |
| 6,581,535 B2 | 6/2003 | Barry et al. |
| 6,615,754 B2 | 9/2003 | Unruh et al. |
| 6,644,225 B2 | 11/2003 | Keaton et al. |
| 6,681,706 B2 | 1/2004 | Sauder et al. |
| 6,748,885 B2 | 6/2004 | Sauder et al. |
| 6,752,095 B1 | 6/2004 | Rylander et al. |
| 6,827,029 B1 | 12/2004 | Wendte et al. |
| 6,863,006 B2 | 3/2005 | Sandoval et al. |
| 7,162,963 B2 | 1/2007 | Sauder et al. |
| 7,273,016 B2 | 9/2007 | Landphair et al. |
| 7,334,532 B2 | 2/2008 | Sauder et al. |
| 7,343,868 B2 | 3/2008 | Stephens et al. |
| 7,377,221 B1 | 5/2008 | Brockmeier et al. |
| 7,448,334 B2 | 11/2008 | Mariman et al. |
| 7,490,565 B2 | 2/2009 | Holly |
| 7,571,688 B1 | 8/2009 | Friestad et al. |
| 7,617,785 B2 | 11/2009 | Wendte |
| 7,631,606 B2 | 12/2009 | Sauder et al. |
| 7,631,607 B2 | 12/2009 | Vandersnick |
| 7,665,409 B2 | 2/2010 | Johnson |
| 7,669,538 B2 | 3/2010 | Memory et al. |
| 7,699,009 B2 | 4/2010 | Sauder et al. |
| 7,717,048 B2 | 5/2010 | Peterson et al. |
| 7,726,251 B1 | 6/2010 | Peterson et al. |
| 7,735,438 B2 | 6/2010 | Riewerts et al. |
| 7,775,167 B2 | 8/2010 | Stehling et al. |
| 7,918,168 B2 | 4/2011 | Garner et al. |
| 7,938,074 B2 | 5/2011 | Liu |
| 8,074,586 B2 | 12/2011 | Garner et al. |
| 8,078,367 B2 | 12/2011 | Sauder et al. |
| 8,166,896 B2 | 5/2012 | Shoup |
| 8,275,525 B2 | 9/2012 | Kowalchuk et al. |
| 8,276,529 B2 | 10/2012 | Garner et al. |
| 8,281,725 B2 | 10/2012 | Wendte et al. |
| 8,297,210 B2 | 10/2012 | Spiesberger |
| 8,365,679 B2 | 2/2013 | Landphair et al. |
| 8,418,634 B2 | 4/2013 | Shoup |
| 8,418,636 B2 | 4/2013 | Liu et al. |
| 8,448,587 B2 | 5/2013 | Kowalchuk et al. |
| 8,522,699 B2 | 9/2013 | Garner et al. |
| 8,522,889 B2 | 9/2013 | Adams et al. |
| 8,618,465 B2 | 12/2013 | Tevs et al. |
| 8,671,856 B2 | 3/2014 | Garner et al. |
| 8,677,914 B2 | 3/2014 | Stark |
| 8,746,159 B2 | 6/2014 | Garner et al. |
| 8,770,121 B2 | 7/2014 | Bragatto |
| 8,813,663 B2 | 8/2014 | Garner et al. |
| 8,825,310 B2 | 9/2014 | Kowalchuk |
| 8,825,311 B2 | 9/2014 | Kowalchuk |
| 8,843,281 B2 | 9/2014 | Wilhelmi et al. |
| 8,850,995 B2 | 10/2014 | Garner et al. |
| 8,850,997 B2 | 10/2014 | Silbernagel et al. |
| 8,850,998 B2 | 10/2014 | Garner et al. |
| 8,863,676 B2 | 10/2014 | Brockmann et al. |
| 8,869,629 B2 | 10/2014 | Noble et al. |
| 8,869,719 B2 | 10/2014 | Garner et al. |
| 8,893,630 B2 | 11/2014 | Kowalchuk et al. |
| 8,910,582 B2 | 12/2014 | Mariman et al. |
| 8,925,471 B2 | 1/2015 | Adams et al. |
| 8,928,486 B2 | 1/2015 | Hui et al. |
| 8,942,894 B2 | 1/2015 | Garner et al. |
| 8,942,896 B2 | 1/2015 | Mayerle |
| 8,948,980 B2 | 2/2015 | Garner et al. |
| 8,985,037 B2 | 3/2015 | Radtke et al. |
| 9,010,258 B1 | 4/2015 | Richard et al. |
| 9,043,950 B2 | 6/2015 | Wendte et al. |
| 9,119,339 B2 | 9/2015 | Bergere |
| 9,137,942 B2 | 9/2015 | Adams et al. |
| 9,144,190 B2 | 9/2015 | Henry et al. |
| 9,148,992 B2 | 10/2015 | Staeter |
| 9,155,242 B2 | 10/2015 | Adams et al. |
| 9,179,594 B2 | 11/2015 | Graham |
| 9,179,595 B2 | 11/2015 | Kormann et al. |
| 9,198,343 B2 | 12/2015 | Mairman et al. |
| 9,216,860 B2 | 12/2015 | Friestad et al. |
| 9,237,687 B2 | 1/2016 | Sauder et al. |
| 9,265,191 B2 | 2/2016 | Sauder et al. |
| 9,277,688 B2 | 3/2016 | Wilhelmi et al. |
| 9,288,937 B2 | 3/2016 | Sauder et al. |
| 9,313,941 B2 | 4/2016 | Garner et al. |
| 9,313,943 B2 | 4/2016 | Zumdome et al. |
| 9,326,441 B2 | 5/2016 | Donadon |
| 9,332,688 B2 | 5/2016 | Zumdome et al. |
| 9,345,188 B2 | 5/2016 | Garner et al. |
| 9,345,189 B2 | 5/2016 | Harmelink et al. |
| 9,351,440 B2 | 5/2016 | Sauder |
| 9,357,689 B2 | 6/2016 | Beck et al. |
| 9,357,692 B2 | 6/2016 | Johnson et al. |
| 9,398,739 B2 | 7/2016 | Silbernagel et al. |
| 9,426,939 B2 | 8/2016 | Zumdome |
| 9,426,940 B2 | 8/2016 | Connors et al. |
| 9,445,539 B2 | 9/2016 | Rans |
| 9,451,740 B2 | 9/2016 | Kowalchuk |
| 9,475,497 B2 | 10/2016 | Henson et al. |
| 9,480,199 B2 | 11/2016 | Garner et al. |
| 9,510,502 B2 | 12/2016 | Garner et al. |
| 9,554,503 B2 | 1/2017 | Noer et al. |
| 9,578,799 B2 | 2/2017 | Allgaier et al. |
| 9,585,304 B2 | 3/2017 | Roberge et al. |
| 9,591,800 B2 | 3/2017 | Kowalchuk et al. |
| 9,596,803 B2 | 3/2017 | Wendte et al. |
| 9,603,298 B2 | 3/2017 | Wendte et al. |
| 9,615,504 B2 | 4/2017 | Sauder et al. |
| 9,622,401 B2 | 4/2017 | Stevenson |
| 9,629,298 B2 | 4/2017 | Dienst |
| 9,635,802 B2 | 5/2017 | Rains et al. |
| 9,635,804 B2 | 5/2017 | Carr et al. |
| 9,648,800 B2 | 5/2017 | Garner et al. |
| 9,648,802 B2 | 5/2017 | Wendte et al. |
| 9,661,799 B2 | 5/2017 | Garner et al. |
| 9,675,002 B2 | 6/2017 | Roszman |
| 9,675,004 B2 | 6/2017 | Landphair et al. |
| 9,686,905 B2 | 6/2017 | Garner et al. |
| 9,686,906 B2 | 6/2017 | Garner et al. |
| 9,693,496 B2 | 7/2017 | Tevs et al. |
| 9,693,498 B2 | 7/2017 | Zumdome et al. |
| 9,699,955 B2 | 7/2017 | Garner et al. |
| 9,706,701 B2 | 7/2017 | Prickel et al. |
| 9,706,702 B2 | 7/2017 | Wendte et al. |
| 9,706,705 B2 | 7/2017 | Czapka et al. |
| 9,723,779 B2 | 8/2017 | Wendte et al. |
| 9,730,377 B2 | 8/2017 | Kowalchuk et al. |
| 9,730,379 B2 | 8/2017 | Wendte et al. |
| 9,733,634 B2 | 8/2017 | Prickel et al. |
| 9,750,174 B2 | 9/2017 | Sauder et al. |
| 9,756,778 B2 | 9/2017 | Straeter |
| 9,756,779 B2 | 9/2017 | Wilhelmi et al. |
| 9,763,380 B2 | 9/2017 | Hahn et al. |
| 9,769,978 B2 | 9/2017 | Radtke |
| 9,775,279 B2 | 10/2017 | Garner et al. |
| 9,781,874 B2 | 10/2017 | Johnson et al. |
| 9,795,076 B2 | 10/2017 | Lind et al. |

(56) References Cited

U.S. PATENT DOCUMENTS

| | | |
|---|---|---|
| 9,795,077 B2 | 10/2017 | Hahn et al. |
| 9,801,332 B2 | 10/2017 | Landphair et al. |
| 9,807,922 B2 | 11/2017 | Garner et al. |
| 9,807,924 B2 | 11/2017 | Garner et al. |
| 9,814,172 B2 | 11/2017 | Achen et al. |
| 9,814,176 B2 | 11/2017 | Kowalchuk |
| 9,820,429 B2 | 11/2017 | Garner et al. |
| 9,826,676 B2 | 11/2017 | Borkgren et al. |
| 9,826,677 B2 | 11/2017 | Gervais et al. |
| 9,832,921 B2 | 12/2017 | Anderson et al. |
| 9,836,036 B2 | 12/2017 | Johnson et al. |
| 9,848,524 B2 | 12/2017 | Sauder et al. |
| 9,848,528 B2 | 12/2017 | Werner et al. |
| 9,854,732 B2 | 1/2018 | Thompson et al. |
| 9,861,025 B2 | 1/2018 | Schaefer et al. |
| 9,861,030 B2 | 1/2018 | Garner et al. |
| 9,861,031 B2 | 1/2018 | Garner et al. |
| 9,867,328 B2 | 1/2018 | Tevs et al. |
| 9,869,571 B2 | 1/2018 | Hoberge et al. |
| 9,883,625 B2 | 2/2018 | Kock et al. |
| 9,883,626 B2 | 2/2018 | Heim et al. |
| 9,888,624 B2 | 2/2018 | Maniar et al. |
| 9,894,830 B2 | 2/2018 | Horsch |
| 9,902,571 B2 | 2/2018 | Hui et al. |
| 9,918,427 B2 | 3/2018 | Anderson et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,943,027 B2 | 4/2018 | Sauder et al. |
| 9,949,426 B2 | 4/2018 | Radtke et al. |
| 9,949,427 B2 | 4/2018 | Schweitzer et al. |
| 9,955,625 B2 | 5/2018 | Baurer et al. |
| 9,961,825 B2 | 5/2018 | Allgaier et al. |
| 9,964,124 B2 | 5/2018 | Maro |
| 9,968,029 B2 | 5/2018 | Funck et al. |
| 9,969,569 B2 | 5/2018 | Borkgren |
| 9,970,490 B2 | 5/2018 | Henry et al. |
| 9,974,230 B2 | 5/2018 | Sauder et al. |
| 9,979,338 B2 | 5/2018 | Dollinger et al. |
| 9,999,174 B2 | 6/2018 | Funck et al. |
| 9,999,175 B2 | 6/2018 | Baurer et al. |
| 10,004,173 B2 | 6/2018 | Garner et al. |
| 10,010,025 B2 | 7/2018 | Dienst et al. |
| 10,028,427 B2 | 7/2018 | Arnett et al. |
| 10,028,428 B2 | 7/2018 | Moorehead et al. |
| 10,028,436 B2 | 7/2018 | Ricketts et al. |
| 10,045,474 B2 | 8/2018 | Bachman et al. |
| 10,045,478 B2 | 8/2018 | Posselius |
| 10,051,782 B2 | 8/2018 | Wilhelmi et al. |
| 10,064,323 B2 | 9/2018 | Hahn et al. |
| 10,085,375 B2 | 10/2018 | Engel et al. |
| 10,091,926 B2 | 10/2018 | Maro |
| 10,104,830 B2 | 10/2018 | Heathcote |
| 10,117,377 B2 | 11/2018 | Dienst et al. |
| 10,123,524 B2 | 11/2018 | Roberge et al. |
| 10,154,622 B2 | 12/2018 | Thompson |
| 10,159,176 B2 | 12/2018 | Baitinger et al. |
| 10,165,724 B2 | 1/2019 | Nilson et al. |
| 10,172,277 B2 | 1/2019 | Thompson |
| 10,188,027 B2 | 1/2019 | Hahn et al. |
| 10,206,325 B2 | 2/2019 | Schoeny et al. |
| 10,206,326 B2 | 2/2019 | Garner et al. |
| 10,225,978 B1 | 3/2019 | Schoeny et al. |
| 10,227,998 B2 | 3/2019 | Lacher et al. |
| 10,231,376 B1 | 3/2019 | Stanhope et al. |
| 10,257,974 B1 | 4/2019 | Schoeny et al. |
| 10,264,723 B2 | 4/2019 | Gresch et al. |
| 10,278,325 B2 | 5/2019 | Anderson et al. |
| 10,296,017 B2 | 5/2019 | Schoeny et al. |
| 10,299,424 B2 | 5/2019 | Hamilton |
| 10,306,824 B2 | 6/2019 | Nelson et al. |
| 10,308,116 B2 | 6/2019 | Czapka et al. |
| 10,337,645 B2 | 7/2019 | Roberge et al. |
| 10,351,364 B2 | 7/2019 | Green et al. |
| 10,368,478 B2 | 8/2019 | Schoeny et al. |
| 10,375,879 B2 | 8/2019 | Garner et al. |
| 10,379,547 B2 | 8/2019 | Thompson et al. |
| 10,408,667 B2 | 9/2019 | Schoeny et al. |
| 10,426,073 B2 | 10/2019 | Totten et al. |
| 10,433,475 B2 | 10/2019 | Gentili et al. |
| 10,448,561 B2 | 10/2019 | Schoeny et al. |
| 10,455,757 B2 | 10/2019 | Sauder et al. |
| 10,455,758 B2 | 10/2019 | Schoeny et al. |
| 10,455,760 B2 | 10/2019 | Stuber et al. |
| 10,462,956 B2 | 11/2019 | Hamilton |
| 10,462,960 B2 | 11/2019 | Duman |
| 10,470,355 B2 | 11/2019 | Renault et al. |
| 10,477,757 B2 | 11/2019 | Schoeny et al. |
| 10,481,617 B2 | 11/2019 | Engel et al. |
| 10,485,154 B2 | 11/2019 | Connell et al. |
| 10,524,409 B2 | 1/2020 | Posselius et al. |
| 10,524,410 B2 | 1/2020 | Schoeny et al. |
| 10,531,606 B2 | 1/2020 | Posselius |
| 10,537,055 B2 | 1/2020 | Gresch et al. |
| 10,548,259 B2 | 2/2020 | Heathcote |
| 10,555,454 B2 | 2/2020 | Gerner et al. |
| 10,561,052 B2 | 2/2020 | Barrick et al. |
| 10,575,456 B2 | 3/2020 | Schoeny et al. |
| 10,575,459 B2 | 3/2020 | Gervais et al. |
| 10,575,460 B2 | 3/2020 | Davis et al. |
| 10,582,655 B2 | 3/2020 | Kowalchuk |
| 10,602,656 B2 | 3/2020 | Bartelson et al. |
| 10,645,863 B2 | 5/2020 | Grimm et al. |
| 10,653,056 B2 | 5/2020 | Garner et al. |
| 10,660,261 B2 | 5/2020 | Johnson et al. |
| 10,667,461 B2 | 6/2020 | Kowalchuk et al. |
| 10,709,058 B2 | 7/2020 | Thompson |
| 10,729,054 B2 | 8/2020 | Dekam |
| 10,729,063 B2 | 8/2020 | Garner et al. |
| 10,743,460 B2 | 8/2020 | Gilbert et al. |
| 10,750,658 B2 | 8/2020 | Schoeny et al. |
| 10,750,662 B2 | 8/2020 | Garner et al. |
| 10,750,663 B2 | 8/2020 | Garner et al. |
| 10,757,854 B2 | 9/2020 | Stanhope |
| 10,765,057 B2 | 9/2020 | Radtke et al. |
| 10,768,331 B2 | 9/2020 | Koch et al. |
| 10,772,256 B2 | 9/2020 | Stuber |
| 10,779,456 B2 | 9/2020 | Kowalchuk |
| 10,779,460 B2 | 9/2020 | Pirkenseer |
| 10,779,462 B2 | 9/2020 | Gresch et al. |
| 10,806,062 B2 | 10/2020 | Zemenchik |
| 10,806,070 B2 | 10/2020 | Garner et al. |
| 10,806,071 B2 | 10/2020 | Kowalchuk |
| 10,813,276 B2 | 10/2020 | Heathcote |
| 10,820,464 B2 | 11/2020 | Kowalchuk et al. |
| 10,820,465 B2 | 11/2020 | Kowalchuk et al. |
| 10,820,483 B2 | 11/2020 | Gervais et al. |
| 10,820,485 B2 | 11/2020 | Swanson et al. |
| 10,820,488 B2 | 11/2020 | Schoeny et al. |
| 10,820,489 B2 | 11/2020 | Garner et al. |
| 10,820,490 B2 | 11/2020 | Schoeny et al. |
| 10,823,748 B2 | 11/2020 | Allgaier |
| 10,827,663 B2 | 11/2020 | Gresch et al. |
| 10,827,666 B2 | 11/2020 | Schoeny et al. |
| 10,827,671 B2 | 11/2020 | Kowalchuk et al. |
| 10,827,740 B2 | 11/2020 | Wonderlich et al. |
| 10,842,068 B2 | 11/2020 | Czapka et al. |
| 10,842,072 B2 | 11/2020 | Wilhelmi et al. |
| 10,842,073 B2 | 11/2020 | Garner et al. |
| 10,860,189 B2 | 12/2020 | Allgaier et al. |
| RE48,572 E | 6/2021 | Garner et al. |
| 2009/0292426 A1 | 11/2009 | Nelson et al. |
| 2010/0224110 A1 | 9/2010 | Mariman |
| 2011/0067260 A1 | 3/2011 | Kim et al. |
| 2012/0265410 A1 | 10/2012 | Graham et al. |
| 2013/0032363 A1 | 2/2013 | Curry et al. |
| 2014/0277959 A1 | 9/2014 | Wagers et al. |
| 2015/0223392 A1 | 8/2015 | Wilhelmi et al. |
| 2015/0237793 A1 | 8/2015 | Rans |
| 2016/0229575 A1 | 8/2016 | Lapointe |
| 2017/0000008 A1 | 1/2017 | Anderson et al. |
| 2017/0049040 A1 | 2/2017 | Kinzenbaw |
| 2017/0142891 A1 | 5/2017 | Lucas et al. |
| 2017/0156256 A1 | 6/2017 | Allgaier et al. |

(56) References Cited

U.S. PATENT DOCUMENTS

| | | |
|---|---|---|
| 2017/0339819 A1 | 11/2017 | Kowalchuk et al. |
| 2017/0359949 A1 | 12/2017 | Garner et al. |
| 2018/0014457 A1 | 1/2018 | Mertlich et al. |
| 2018/0035603 A1 | 2/2018 | Kremmer et al. |
| 2018/0035622 A1 | 2/2018 | Gresch et al. |
| 2018/0049367 A1 | 2/2018 | Garner et al. |
| 2018/0110186 A1 | 4/2018 | Bovee |
| 2018/0116102 A1 | 5/2018 | Taylor et al. |
| 2018/0153094 A1 | 6/2018 | Radtke et al. |
| 2018/0168104 A1 | 6/2018 | Johnson et al. |
| 2018/0192577 A1 | 7/2018 | Smith et al. |
| 2018/0224537 A1 | 8/2018 | Taylor et al. |
| 2018/0249621 A1 | 9/2018 | Horsch |
| 2018/0259979 A1 | 9/2018 | Schoeny et al. |
| 2018/0263177 A1 | 9/2018 | Heathcote |
| 2018/0310468 A1 | 11/2018 | Schoeny et al. |
| 2019/0029165 A1 | 1/2019 | Leimkuehler et al. |
| 2019/0075714 A1 | 3/2019 | Koch et al. |
| 2019/0098828 A1 | 4/2019 | Wilhelmi et al. |
| 2019/0116721 A1 | 4/2019 | Donadon et al. |
| 2019/0116722 A1 | 4/2019 | Donadon et al. |
| 2019/0124824 A1 | 5/2019 | Hubner et al. |
| 2019/0141880 A1 | 5/2019 | Zemenchik et al. |
| 2019/0150350 A1 | 5/2019 | Engel et al. |
| 2019/0159398 A1 | 5/2019 | McMenamy et al. |
| 2019/0162164 A1 | 5/2019 | Funk et al. |
| 2019/0183036 A1 | 6/2019 | Leimkuehler et al. |
| 2019/0223372 A1 | 7/2019 | Koch et al. |
| 2019/0230845 A1 | 8/2019 | Buchner et al. |
| 2019/0230846 A1 | 8/2019 | Koch et al. |
| 2019/0230847 A1 | 8/2019 | Forrest et al. |
| 2019/0239425 A1 | 8/2019 | Garner et al. |
| 2019/0246551 A1 | 8/2019 | Campbell et al. |
| 2019/0246552 A1 | 8/2019 | Sauder et al. |
| 2019/0254222 A1 | 8/2019 | Rhodes et al. |
| 2019/0289774 A1 | 9/2019 | Prystupa et al. |
| 2019/0289776 A1 | 9/2019 | Rempel et al. |
| 2019/0289778 A1 | 9/2019 | Koch et al. |
| 2019/0289779 A1 | 9/2019 | Koch et al. |
| 2019/0343037 A1 | 11/2019 | Werner et al. |
| 2019/0343038 A1 | 11/2019 | Wilhelmi |
| 2019/0364724 A1 | 12/2019 | Radtke et al. |
| 2019/0373797 A1 | 12/2019 | Schoeny et al. |
| 2019/0373801 A1 | 12/2019 | Schoeny et al. |
| 2019/0380259 A1 | 12/2019 | Frank et al. |
| 2019/0387663 A1 | 12/2019 | Wang et al. |
| 2020/0000003 A1 | 1/2020 | Kowalchuk et al. |
| 2020/0000009 A1 | 1/2020 | Henry et al. |
| 2020/0000011 A1 | 1/2020 | Hebner et al. |
| 2020/0000012 A1 | 1/2020 | Hubner et al. |
| 2020/0000013 A1 | 1/2020 | Rylander et al. |
| 2020/0000016 A1 | 1/2020 | Hubner et al. |
| 2020/0008340 A1 | 1/2020 | Stanhope |
| 2020/0015405 A1 | 1/2020 | Kowalchuk et al. |
| 2020/0015406 A1 | 1/2020 | Wright et al. |
| 2020/0022300 A1 | 1/2020 | Gervais et al. |
| 2020/0045869 A1 | 2/2020 | Stanhope et al. |
| 2020/0045877 A1 | 2/2020 | Riffel et al. |
| 2020/0053955 A1 | 2/2020 | Borkgren et al. |
| 2020/0068778 A1 | 3/2020 | Schoeny et al. |
| 2020/0068788 A1 | 3/2020 | Frank et al. |
| 2020/0100421 A1 | 4/2020 | Wang |
| 2020/0100423 A1 | 4/2020 | Dienst |
| 2020/0107487 A1 | 4/2020 | Antich |
| 2020/0107492 A1 | 4/2020 | Antich |
| 2020/0107493 A1 | 4/2020 | Straeter |
| 2020/0107498 A1 | 4/2020 | Anderson et al. |
| 2020/0113118 A1 | 4/2020 | Stanhope |
| 2020/0113169 A1 | 4/2020 | Jelenkovic et al. |
| 2020/0128724 A1 | 4/2020 | Stoller et al. |
| 2020/0128725 A1 | 4/2020 | Rhodes et al. |
| 2020/0132654 A1 | 4/2020 | Pomedli |
| 2020/0146200 A1 | 5/2020 | Schoeny et al. |
| 2020/0156470 A1 | 5/2020 | Stanhope et al. |
| 2020/0196515 A1 | 6/2020 | Engel |
| 2020/0196520 A1 | 6/2020 | Schoeny et al. |
| 2020/0205337 A1 | 7/2020 | Millie et al. |
| 2020/0214193 A1 | 7/2020 | Shivak |
| 2020/0236842 A1 | 7/2020 | Buehler |
| 2020/0245529 A1 | 8/2020 | Thompson et al. |
| 2020/0245535 A1 | 8/2020 | Schilling et al. |
| 2020/0253107 A1 | 8/2020 | Madison et al. |
| 2020/0260630 A1 | 8/2020 | Stanhope et al. |
| 2020/0260633 A1 | 8/2020 | Kovach et al. |
| 2020/0260634 A1 | 8/2020 | Kovach et al. |
| 2020/0260637 A1 | 8/2020 | Thompson et al. |
| 2020/0267355 A1 | 8/2020 | Mentzer |
| 2020/0267882 A1 | 8/2020 | Mcluckie et al. |
| 2020/0281111 A1 | 9/2020 | Walter et al. |
| 2020/0281112 A1 | 9/2020 | Salowitz et al. |
| 2020/0281182 A1 | 9/2020 | Kiefer et al. |
| 2020/0296882 A1 | 9/2020 | Madison et al. |
| 2020/0315081 A1 | 10/2020 | Plattner |
| 2020/0329627 A1 | 10/2020 | Johnson et al. |
| 2020/0329628 A1 | 10/2020 | Mcluckie et al. |
| 2020/0329631 A1 | 10/2020 | Johnson et al. |
| 2020/0337200 A1 | 10/2020 | Smith |
| 2020/0337209 A1 | 10/2020 | Kowalchuk |
| 2020/0337213 A1 | 10/2020 | Schoeny |
| 2020/0337218 A1 | 10/2020 | Puhalla et al. |
| 2020/0337222 A1 | 10/2020 | Anderson et al. |
| 2020/0337223 A1 | 10/2020 | Snipes et al. |
| 2020/0344943 A1 | 11/2020 | Garner et al. |
| 2020/0344944 A1 | 11/2020 | Wonderlich et al. |
| 2020/0352081 A1 | 11/2020 | Arnett et al. |
| 2020/0352087 A1 | 11/2020 | Garner et al. |
| 2020/0355667 A1 | 11/2020 | Schoeny et al. |
| 2020/0359551 A1 | 11/2020 | Donadon et al. |
| 2020/0359557 A1 | 11/2020 | Utz |
| 2020/0359559 A1 | 11/2020 | Koch et al. |
| 2020/0375079 A1 | 12/2020 | Smith et al. |
| 2020/0375088 A1 | 12/2020 | Utz |
| 2020/0375090 A1 | 12/2020 | Morgan et al. |
| 2020/0383262 A1 | 12/2020 | Schoeny et al. |
| 2020/0387720 A1 | 12/2020 | Stanhope |
| 2020/0390022 A1 | 12/2020 | Stanhope |
| 2020/0390025 A1 | 12/2020 | Schoeny et al. |
| 2020/0390026 A1 | 12/2020 | Walter et al. |
| 2020/0396888 A1 | 12/2020 | Steinke et al. |
| 2020/0396889 A1 | 12/2020 | Kowalchuk |
| 2020/0396896 A1 | 12/2020 | Donadon et al. |
| 2020/0396897 A1 | 12/2020 | Stoller et al. |
| 2020/0404831 A1 | 12/2020 | Kowalchuk et al. |
| 2020/0404832 A1 | 12/2020 | Schoeny et al. |
| 2020/0404833 A1 | 12/2020 | Stanhope et al. |
| 2020/0404837 A1 | 12/2020 | Thompson et al. |
| 2021/0007271 A1 | 1/2021 | Schoeny et al. |
| 2021/0007272 A1 | 1/2021 | Schoeny et al. |

FOREIGN PATENT DOCUMENTS

| | | |
|---|---|---|
| BR | 202016000413 U2 | 10/2017 |
| BR | 202016001378 U2 | 10/2017 |
| BR | 102019000833 A2 | 7/2020 |
| CA | 2291598 C | 2/2007 |
| CN | 2857433 Y | 1/2007 |
| CN | 102763507 A | 11/2012 |
| CN | 203233664 U | 10/2013 |
| CN | 203801244 U | 9/2014 |
| CN | 104956815 A | 10/2015 |
| CN | 105850308 A | 8/2016 |
| CN | 205755411 U | 12/2016 |
| CN | 205993088 U | 3/2017 |
| CN | 106612772 A | 5/2017 |
| CN | 107087462 A | 8/2017 |
| CN | 108064507 A | 5/2018 |
| CN | 107667630 B | 7/2018 |
| CN | 108243683 A | 7/2018 |
| CN | 207573891 U | 7/2018 |
| CN | 108353582 A | 8/2018 |
| CN | 108650948 A | 10/2018 |
| CN | 108781647 A | 11/2018 |
| CN | 109168453 A | 1/2019 |
| CN | 208317369 U | 1/2019 |

(56) References Cited

FOREIGN PATENT DOCUMENTS

| | | |
|---|---|---|
| CN | 109451928 A | 3/2019 |
| CN | 109451931 A | 3/2019 |
| CN | 209314270 U | 8/2019 |
| CN | 209314271 U | 8/2019 |
| CN | 111406477 A | 7/2020 |
| CN | 111630983 A | 9/2020 |
| CN | 111886974 A | 11/2020 |
| CN | 212393213 U | 1/2021 |
| DE | 3003919 A1 | 8/1981 |
| DE | 3441704 A1 | 5/1986 |
| DE | 202005002495 U1 | 5/2005 |
| DE | 202005005276 U1 | 6/2005 |
| DE | 202008008487 U1 | 8/2008 |
| DE | 102015101256 A1 | 7/2016 |
| DE | 102015121600 A1 | 6/2017 |
| DE | 102016207510 A1 | 11/2017 |
| DE | 102016218859 A1 | 3/2018 |
| DE | 102017203854 A1 | 9/2018 |
| DE | 102017109042 A1 | 10/2018 |
| DE | 102018111584 A1 | 11/2019 |
| DE | 102018112948 A1 | 12/2019 |
| DE | 102018120184 A1 | 2/2020 |
| DE | 202020102846 U1 | 6/2020 |
| DE | 202020104231 U1 | 7/2020 |
| DE | 102019108987 A1 | 10/2020 |
| DE | 102019118149 A1 | 1/2021 |
| EP | 0237766 A1 | 9/1987 |
| EP | 2374342 B1 | 5/2013 |
| EP | 3127415 A1 | 2/2017 |
| EP | 3135089 A1 | 3/2017 |
| EP | 2853141 B1 | 6/2017 |
| EP | 2974582 B1 | 9/2017 |
| EP | 2901838 B1 | 11/2017 |
| EP | 2832200 B1 | 5/2018 |
| EP | 3065529 B1 | 5/2018 |
| EP | 3332624 A1 | 6/2018 |
| EP | 3338524 A1 | 6/2018 |
| EP | 2932818 B1 | 8/2018 |
| EP | 3366098 A1 | 8/2018 |
| EP | 3219186 B1 | 11/2018 |
| EP | 3440910 A1 | 2/2019 |
| EP | 3440911 A1 | 2/2019 |
| EP | 2959762 B1 | 5/2019 |
| EP | 3305054 B1 | 7/2019 |
| EP | 3284332 B1 | 10/2019 |
| EP | 3278649 B1 | 11/2019 |
| EP | 3281509 B1 | 11/2019 |
| EP | 3372064 B1 | 2/2020 |
| EP | 3360403 A1 | 4/2020 |
| EP | 3372065 B1 | 4/2020 |
| EP | 3417689 B1 | 4/2020 |
| EP | 3440909 B1 | 4/2020 |
| EP | 3127414 B1 | 5/2020 |
| EP | 353009581 | 9/2020 |
| EP | 350125081 | 11/2020 |
| EP | 3520592 B1 | 12/2020 |
| FR | 2961058 A1 | 12/2011 |
| GB | 1253688 A | 11/1971 |
| GB | 2057835 A | 4/1981 |
| JP | 2005333895 A | 12/2005 |
| JP | 2013027389 A | 2/2013 |
| JP | 6523898 B2 | 6/2019 |
| JP | 6545240 B2 | 7/2019 |
| JP | 6546363 B2 | 7/2019 |
| JP | 2019150070 A | 9/2019 |
| JP | 2019165712 A | 10/2019 |
| RU | 2230446 C1 | 6/2004 |
| RU | 2649332 C1 | 4/2018 |
| WO | 1994026090 A2 | 11/1994 |
| WO | WO2004017712 A1 | 3/2004 |
| WO | 2010088703 A1 | 8/2010 |
| WO | WO2015048867 A1 | 4/2015 |
| WO | WO2016071269 A1 | 5/2016 |
| WO | WO2017004074 A1 | 1/2017 |
| WO | 2017040533 A1 | 3/2017 |
| WO | 2017117638 A1 | 7/2017 |
| WO | 2018013859 A1 | 1/2018 |
| WO | WO2018054624 A1 | 3/2018 |
| WO | WO2018054625 A1 | 3/2018 |
| WO | 2018093568 A2 | 5/2018 |
| WO | WO2019050944 A1 | 3/2019 |
| WO | WO2019079205 A1 | 4/2019 |
| WO | WO2019091732 A1 | 5/2019 |
| WO | WO2019108881 A1 | 6/2019 |
| WO | WO2019197963 A1 | 10/2019 |
| WO | WO2020001964 A1 | 1/2020 |
| WO | WO2020011386 A1 | 1/2020 |
| WO | WO2020016047 A1 | 1/2020 |
| WO | WO2020035337 A1 | 2/2020 |
| WO | WO2020039322 A1 | 2/2020 |
| WO | WO2020046586 A1 | 3/2020 |
| WO | WO2020049387 A1 | 3/2020 |
| WO | WO2020109881 A1 | 6/2020 |
| WO | WO2020161566 A1 | 8/2020 |
| WO | WO2020187380 A1 | 9/2020 |
| WO | WO2020194150 A1 | 10/2020 |
| WO | WO2020227608 A1 | 11/2020 |
| WO | WO2020240301 A1 | 12/2020 |
| WO | WO2020247985 A1 | 12/2020 |
| WO | WO2021014231 A1 | 1/2021 |

OTHER PUBLICATIONS

Precision Planting, Precision Planting From County Line AG Services, Keeton Seed Firmers, http://countylineag.ohag4u.com/precision_planting.htm, Feb. 8, 2019, 2 pages.

Lamb and Webster, PrecisionMeter, Improve Planter Performance Where it Counts—In the Meter, http://www.lambandwebster.com/precision-planting/precisionmeter/, 2017, 4 pages.

Planterology, SpeedTube, https://planteralogy.com/solutions/speedtube/, Feb. 12, 2019, 5 pages.

John Deere, John Deere Exactmerge Planter Trench Delivery System and Brushbelt Delivery System, Cross Implement, https://crossimplement.com/news-and-updates/article/2015/06/john-deere-exactemerge-planter-trench-delivery-system-and-brushbelttm-delivery-system, Jun. 11, 2015, 6 pages.

Lamb and Webster, SpeedTube, Focused on the Perfect Plant- and Speed., http://www.lambandwebster.com/precision-planting/speedtube/, 2017, 6 pages.

Precision Planting, PrecisionMeter a Better Finger Meter, Improve Planter Performance Where it Counts—In the Meter, https://www.precisionplanting.com/products/product/precisionmeter, Mar. 7, 2019, 15 pages.

U.S. Appl. No. 16/726,346, filed Dec. 24, 2019, Chad Michael Johnson.

U.S. Appl. No. 16/726,388, filed Dec. 24, 2019, Chad Michael Johnson.

U.S. Appl. No. 16/726,404, filed Dec. 24, 2019, Chad Michael Johnson.

U.S. Appl. No. 16/726,435, filed Dec. 24, 2019, Chad Michael Johnson.

U.S. Appl. No. 16/726,470, filed Dec. 24, 2019, Chad Michael Johnson.

U.S. Appl. No. 16/726,501, filed Dec. 24, 2019, Chad Michael Johnson.

U.S. Appl. No. 16/726,528, filed Dec. 24, 2019, Chad Michael Johnson.

U.S. Appl. No. 16/726,558, filed Dec. 24, 2019, Chad Michael Johnson.

U.S. Appl. No. 16/726,619, filed Dec. 24, 2019, Chad Michael Johnson.

U.S. Appl. No. 16/726,648, filed Dec. 24, 2019, Chad Michael Johnson.

U.S. Appl. No. 16/726,670, filed Dec. 24, 2019, Chad Michael Johnson.

PARTICLE DELIVERY SYSTEM OF AN AGRICULTURAL ROW UNIT

BACKGROUND

The present disclosure relates generally to a particle delivery system of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product delivery system (e.g., including a metering system and a seed tube) is configured to deposit seeds and/or other agricultural products (e.g., fertilizer) into the trench. The opener/agricultural product delivery system is followed by closing discs that move displaced soil back into the trench and/or a packer wheel that packs the soil on top of the deposited seeds/other agricultural products.

Certain row units, or planting implements generally, include a seed storage area configured to store the seeds. The agricultural product delivery system is configured to transfer the seeds from the seed storage area into the trench. For example, the agricultural product delivery system may include a metering system that meters the seeds from the seed storage area into a seed tube for subsequent delivery to the trench. Certain types of seeds may benefit from a particular spacing along the trench. Additionally, the planting implement having the row units may travel at varying speeds based on the type of seed being deposited into the soil, the type and structure of the soil within the field, and other factors. Typically, the row units output the seeds to the trench at the speed that the implement is traveling through the field, which may affect the spacing between the seeds and may cause the seeds to be deposited at locations along the trench other than target locations (e.g., outside the target locations).

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particle delivery system of an agricultural row unit includes a first particle belt configured to receive a particle from a particle metering and singulation unit, a second particle belt configured to receive the particle from the first particle belt and to expel the particle to a trench in soil, and a particle transfer assembly configured to facilitate transfer of the particle from the first particle belt to the second particle belt. The first particle belt is configured to accelerate the particle to a target particle transfer speed, and the second particle belt is configured to accelerate the particle to a target particle exit speed greater than the target particle transfer speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
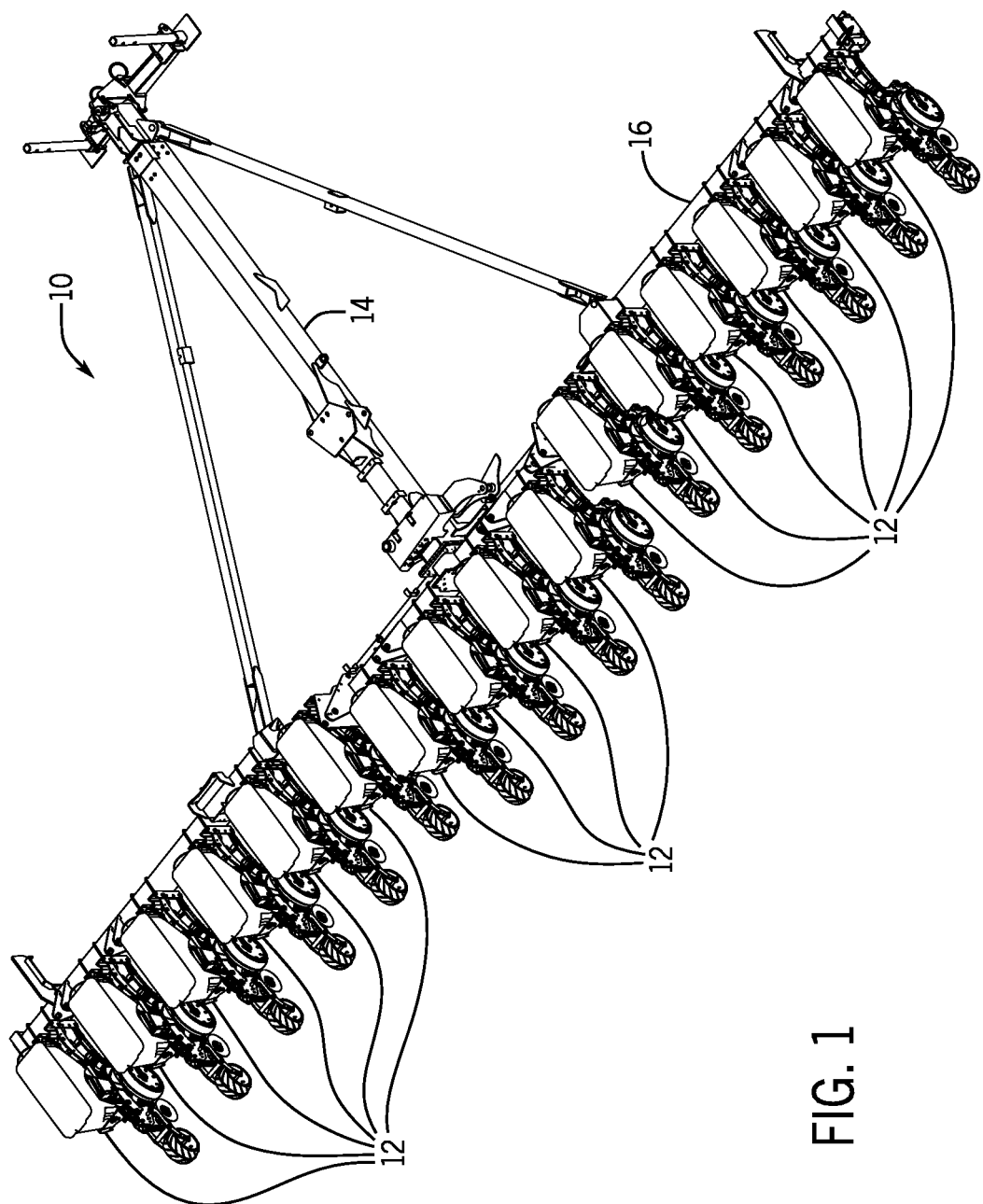
FIG. 1 is a perspective view of an embodiment of an agricultural implement having multiple row units distributed across a width of the agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particle delivery system for a row unit of an agricultural implement. Certain agricultural implements include row units configured to deliver particles (e.g., seeds) to trenches in soil. For example, a particle distribution system may transport the particles from a storage tank of the agricultural implement to the row units (e.g., to a hopper assembly of each row unit or directly to a particle delivery system of each row unit), and/or the particles may be delivered from a hopper assembly of each row unit to a respective particle delivery system. Each particle delivery system may output the particles to a respective trench as the agricultural implement travels over the soil. Certain agricultural implements are configured to travel at particular speeds (e.g., between four kilometers per hour (kph) and thirty kph) while delivering the particles to the trenches. Additionally, a particular spacing between the particles when disposed within the soil may enhance plant development and/or yield.

Accordingly, in certain embodiments, at least one row unit of the agricultural implement includes a particle delivery system configured to deliver the particles to the respective trench in the soil at a particular spacing while reducing the relative ground speed of the particles (e.g., the speed of the particles relative to the ground). The particle delivery system includes a particle disc configured to meter individual particles, thereby establishing the particular spacing between particles. The particle disc is configured to release each particle at a release point of the particle disc, thereby enabling the particle to move to a particle engagement section of a first particle belt of the particle delivery system. The first particle belt include the particle engagement section and a particle exit section. The first particle belt is configured to receive each particle at the particle engagement section and to expel each particle toward a second particle belt at the particle exit section. The second particle belt includes a particle engagement section (e.g., a second particle engagement section) and a particle exit section (e.g., a second particle engagement section). The second particle belt is configured to receive each particle at the particle engagement section and to expel each particle toward the trench in the soil at the particle exit section. For example, the first particle belt and the second particle belt may accelerate the particles to a speed greater than a speed resulting from gravitational acceleration alone. Additionally, the first particle belt and the second particle belt may accelerate the particles such that the relative ground speed of the particles is reduced. As such, the first particle belt and the second particle belt may enable the row unit to more accurately deposit the particles into the trench and/or to travel faster than traditional row units that utilize seed tubes which rely on gravity to accelerate the particles (e.g., seeds) for delivery to soil.

In certain embodiments, the particle delivery system may include an air flow system configured to secure the particles to the particle disc, to remove the particles from the particle disc, to accelerate the particles downwardly from the first particle belt toward the second particle belt, or a combination thereof. For example, the air flow system may include a vacuum source configured to reduce the air pressure within a vacuum passage positioned along a portion of the particle disc, thereby securing the particles to the particle disc. Additionally, the air flow system may provide an air flow configured to remove the particles from the particle disc at the release point.

In some embodiments, the particle delivery system may include a particle transfer assembly configured to facilitate transferring the particles from the first particle belt to the second particle belt. For example, the particle transfer assembly may include a guide wheel disposed between the first particle belt and the second particle belt and configured to rotate to guide the particles from the first particle belt toward the second particle belt. In certain embodiments, the particle transfer assembly may include a particle tube extending from the particle exit section of the first particle belt to the particle engagement section of the second particle belt and configured to guide the particles from the first particle belt to the second particle belt. In some embodiments, the particle transfer assembly may be configured to accelerate the particles flowing from the first particle belt to the second particle belt.

In some embodiments, the particle delivery system may include a particle belt configured to receive the particles from the particle disc or another particle belt and to deposit the particle into the trench in soil. For example, the particle belt may include a particle engagement section configured to receive the particles from the particle disc and a particle exit section configured to expel the particles toward the trench. The particle belt at the particle engagement section may extend at an angle (e.g., at an acute angle) relative to the particle belt at the particle exit section to facilitate receipt/engagement of the particles at the particle engagement section. Additionally, the particle belt at the particle exit section may extend generally parallel to the ground/trench to facilitate deposition of the particles from the exit section into the trench.

With the foregoing in mind, the present embodiments relating to particle delivery systems may be utilized within any suitable agricultural implement. For example, FIG. 1 is a perspective view of an embodiment of an agricultural implement 10 having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a particle path (e.g., trench) within soil of a field. The row unit 12 may also include a particle delivery system (e.g., particle discs) configured to deposit particles (e.g., seeds, fertilizer, and/or other agricultural product(s)) into the particle path/trench. In addition, the row unit 12 may include closing disc(s) and/or a packer wheel positioned behind the particle delivery system. The closing disc(s) are configured to move displaced soil back into the particle path/trench, and the packer wheel is configured to pack soil on top of the deposited particles.

During operation, the agricultural implement 10 may travel at a particular speed along the soil surface while depositing the particles to the trenches. For example, a speed of the agricultural implement may be selected and/or controlled based on soil conditions, a type of the particles delivered by the agricultural implement 10 to the soil, weather conditions, a size/type of the agricultural implement, or a combination thereof. Additionally or alternatively, a particular spacing between the particles when disposed within the soil may enhance plant development and/or yield. Accordingly, in certain embodiments, at least one row unit 12 may include a particle delivery system configured to deposit the particles at the particular spacing while reducing the ground speed of the particles (e.g., as compared to a row unit that employs a particle tube to delivery particles to the soil). As discussed in detail below, the particle delivery system may include a first particle belt configured to accelerate and deliver the particles to a second particle belt. The second particle belt may accelerate the particles to a speed greater than a speed resulting from gravitational acceleration alone (e.g., a speed resulting from the particle falling directly from the first particle belt to the ground with the second particle belt omitted) and may reduce the relative ground speed of the particles (e.g., the speed of the particles relative to the ground). In certain embodiments, the particle delivery system may include a particle belt (e.g., a single particle belt) having a particle engagement section configured to receive the particles from the particle disc and a particle exit section configured to expel the particles toward the trench. The particle belt at the particle engagement section may extend at an angle (e.g., at an acute angle) relative to the particle belt at the particle exit section to facilitate receipt/engagement of the particles at the particle engagement section. Additionally, the particle belt at the particle exit section may extend generally parallel to the ground/trench to facilitate deposition of the particles from the exit section into the trench. As such, the particle delivery system may enable the row unit 12 to travel faster through the field and may reduce the relative ground speed of the particles.

Figure 2:
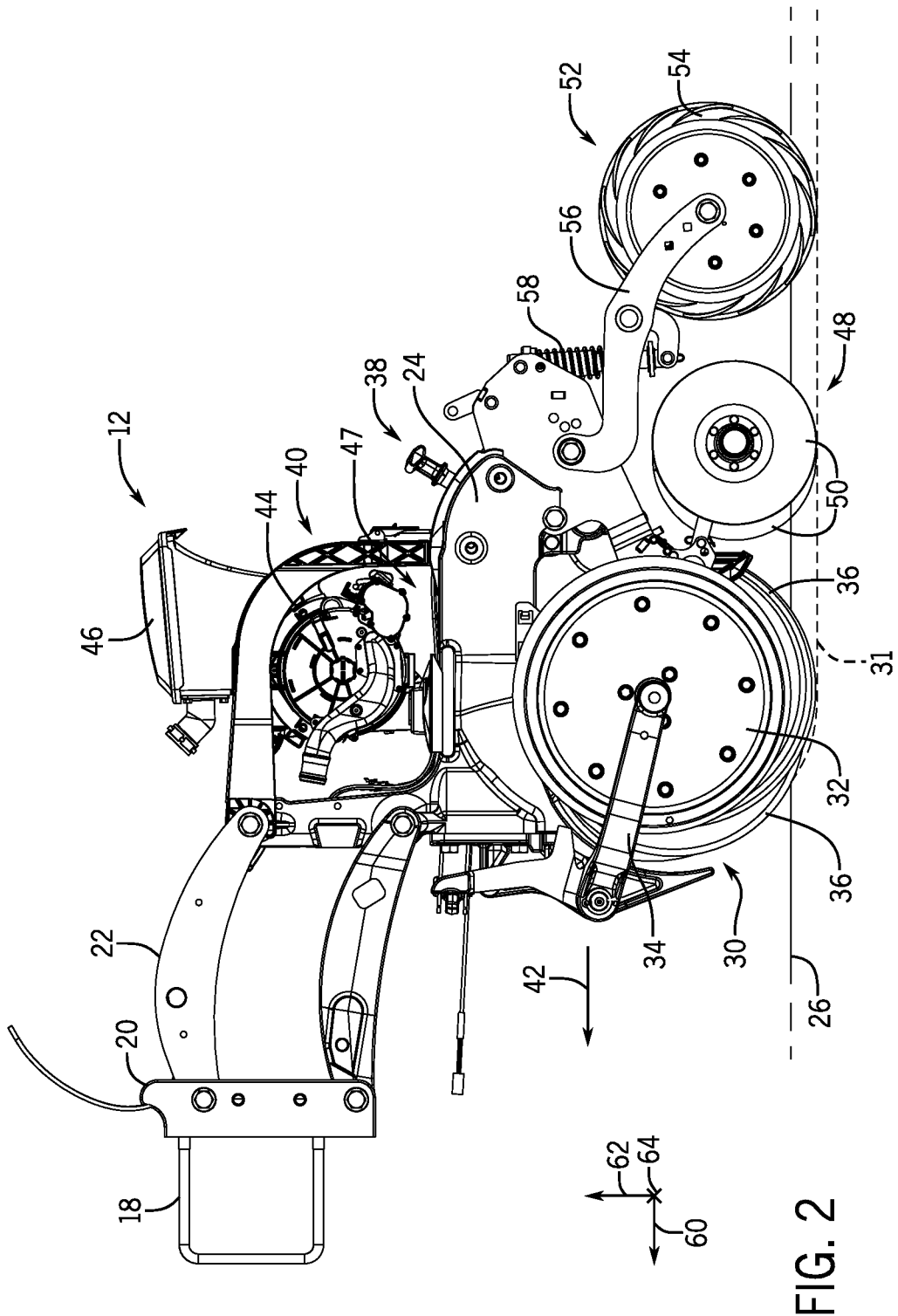
FIG. 2 is a side view of an embodiment of a row unit that may be employed on the agricultural implement of FIG. 1, in accordance with an aspect of the present disclosure.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a U-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 includes an opener assembly 30 that forms a trench 31 in the soil surface 26 for particle deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate the trench 31 into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 includes a particle delivery system 40 configured to deposit particles (e.g., seeds, fertilizer, and/or other agricultural product(s)) into the trench 31 as the row unit 12 traverses the field along a direction of travel 42. As illustrated, the particle delivery system 40 includes a particle metering and singulation unit 44 configured to receive the particles (e.g., seeds) from a hopper assembly 46 (e.g., a particle storage area). In certain embodiments, a hopper of the hopper assembly may be integrally formed with a housing of the particle metering and singulation unit. The hopper assembly 46 is configured to store the particles for subsequent metering by the particle metering and singulation unit 44. As will be described in greater detail below, in some embodiments, the particle metering and singulation unit 44 includes a particle disc configured to rotate to transfer the particles from the hopper assembly 46 toward a particle belt of the particle delivery system 40. The particle belt may generally be disposed between the particle metering and singulation unit 44 and the trench 31 (e.g., adjacent to another particle belt of the particle delivery system 40).

The opener assembly 30 and the particle delivery system 40 are followed by a closing assembly 48 that moves displaced soil back into the trench 31. In the illustrated embodiment, the closing assembly 48 includes two closing discs 50. However, in alternative embodiments, the closing assembly may include other closing devices (e.g., a single closing disc, etc.). In addition, in certain embodiments, the closing assembly may be omitted. In the illustrated embodiment, the closing assembly 48 is followed by a packing assembly 52 configured to pack soil on top of the deposited particles. The packing assembly 52 includes a packer wheel 54, an arm 56 that pivotally couples the packer wheel 54 to the frame 24, and a biasing member 58 configured to urge the packer wheel 54 toward the soil surface 26, thereby causing the packer wheel to pack soil on top of the deposited particles (e.g., seeds and/or other agricultural product(s)). While the illustrated biasing member 58 includes a spring, in alternative embodiments, the biasing member may include another suitable biasing device, such as a hydraulic cylinder or a pneumatic cylinder, among others. For purposes of discussion, reference may be made to a longitudinal axis or direction 60, a vertical axis or direction 62, and a lateral axis or direction 64. For example, the direction of travel 42 of the row unit 12 may be generally along the longitudinal axis 60.

Figure 3:
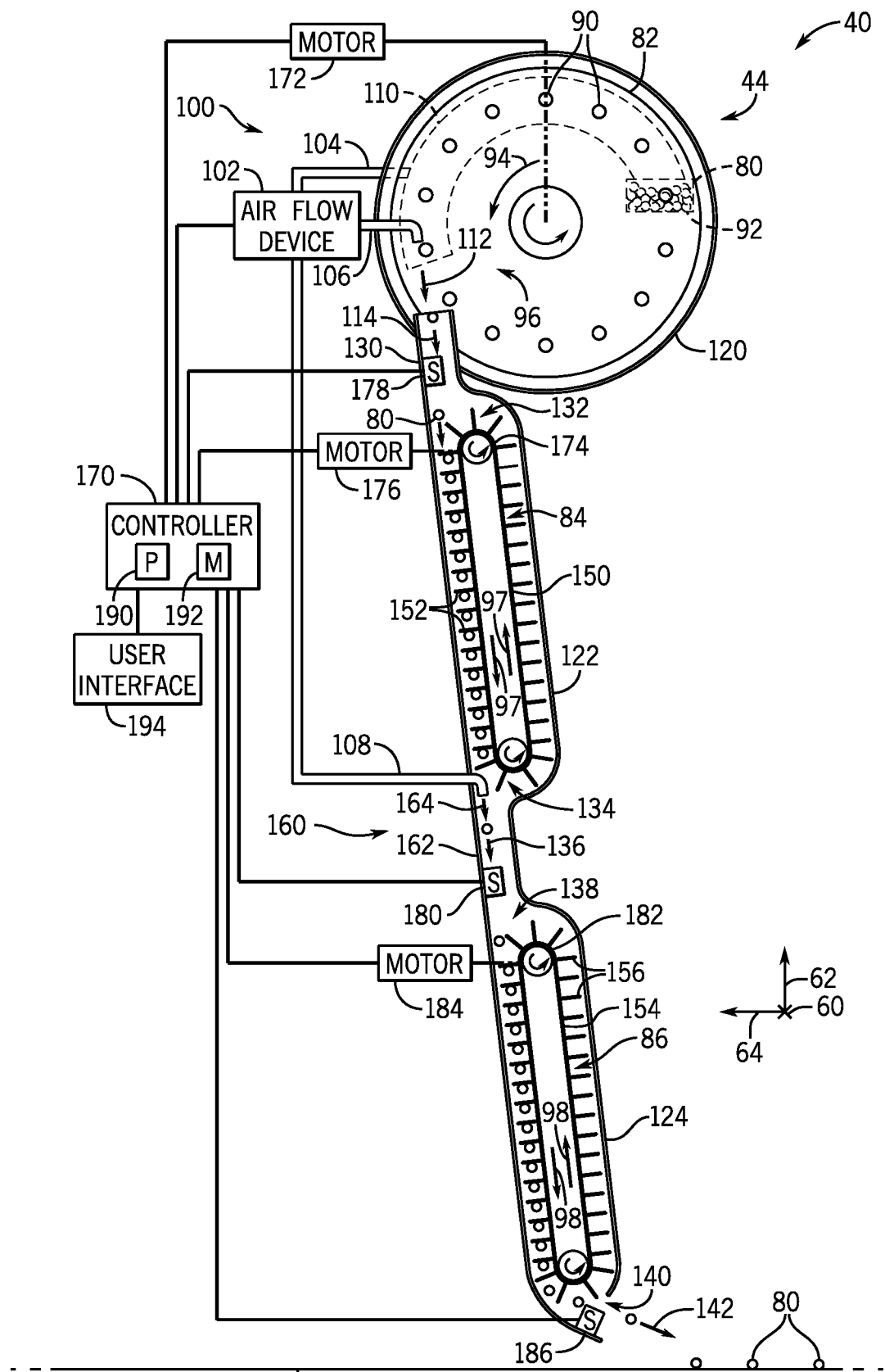
FIG. 3 is a side view of an embodiment of a particle delivery system that may be employed within the row unit of FIG. 2, in accordance with an aspect of the present disclosure.

FIG. 3 is a side view of an embodiment of a particle delivery system 40 that may be employed within the row unit of FIG. 2. As described above, the particle delivery system 40 is configured to meter and accelerate particles 80 (e.g., seeds, fertilizer, other particulate material, or a combination thereof) toward the trench 31 for deposition into the trench 31. In the illustrated embodiment, the particle delivery system 40 includes a particle disc 82 (e.g., of the particle metering and singulation unit 44) configured to meter the particles 80, a first particle belt 84 (e.g., an endless member) configured to accelerate and move the particles 80 to a second particle belt 86 (e.g., an endless member), and the second particle belt 86 configured to accelerate and move the particles 80 toward the trench 31.

The particle disc 82 has apertures 90 configured to receive the particles 80 from a particle hopper 92 of the particle delivery system 40. For example, each aperture 90 may receive a single particle 80. The particle hopper 92 is a particle storage area configured to store the particles 80 for subsequent metering and distribution. In certain embodiments, the particle hopper 92 may be coupled to and/or included as part of a housing of the particle metering and singulation unit 44. Furthermore, in some embodiments, the hopper assembly may provide the particles 80 to the particle hopper 92, and/or the hopper assembly (e.g., the hopper of the hopper assembly) may be coupled to the particle hopper 92. The particle disc 82 is configured to rotate, as indicated by arrow 94, to move the particles 80 from the particle hopper 92 to a release point 96, where the particles 80 are released such that the particles 80 move downwardly toward the first particle belt 84. The first particle belt 84 is configured to rotate, as indicated by arrow 97, to move the particles 80 to the second particle belt 86. The second particle belt 86 is configured to rotate, as indicated by arrows 98, to expel the particles 80 into the trench 31.

The disc 82 having the apertures 90 may be any suitable shape configured to rotate/move to transfer the particles 80 from the particle hopper 92 to the release point 96. For example, the disc 82 may be generally flat, may have a curved portion and a flat portion, may be entirely curved, may be a drum, or may include other suitable shapes, geometries, and/or configurations. In certain embodiments, an inner portion of the disc 82 may curved/raised related to an outer portion of the disc 82 having the apertures 90 (e.g., the disc 82 may be generally bowl-shaped), such that the particles 80 may be directed toward the apertures 90 (e.g., away from the raised inner portion and/or toward the flat outer portion) as the disc 82 rotates. In some embodiments, the disc 82 may be a drum having the apertures 90 disposed along an outer portion and/or an exterior of the drum.

As illustrated, the particle delivery system 40 includes an air flow system 100 having an air flow device 102, a first air tube 104 fluidly coupled to the air flow device 102, a second air tube 106 fluidly coupled to the air flow device 102, and a third air tube 108 fluidly coupled to the air flow device 102. The air flow system 100 is configured to reduce the air pressure within a vacuum passage 110 positioned along a portion of the particle disc 82, thereby drawing the particles 80 from the particle hopper 92 toward and against the apertures 90. As illustrated, the first air tube 104 is fluidly coupled to the air flow device 102 and to the vacuum passage 110. The air flow device 102 is configured to draw air through the apertures 90 aligned with the vacuum passage 110, via the first air tube 104. As the particle disc 82 rotates, the vacuum formed at the apertures 90 secures the particles 80 to the particle disc 82 at the apertures 90, such that the particle disc 82 moves each particle 80 from the particle hopper 92 to the release point 96. At the release point 96, the air flow system 100 provides, via the second air tube 106, a first air flow 112 configured to remove each particle 80 from the respective aperture 90 (e.g., by overcoming the vacuum formed at the respective aperture 90). In certain embodiments, the first air flow 112 may be omitted, and the particles 80 may be released from the apertures 90 due to the vacuum passage 110 ending. For example, at the release point 96, the vacuum passage 110 may end (e.g., the air flow device 102 may no longer draw air through the apertures 90 of the particle disc 82 at the release point 96), and the particles 80 may no longer be secured in the apertures 90. The particles 80 are released from the particle disc 82 along a release trajectory 114. Rotation of the particle disc 82 imparts a velocity on the particles along the release trajectory 114, and the particles 80 accelerate downwardly along the release trajectory 114 under the influence of gravity. In some embodiments, an angle between the release trajectory 114 and the vertical axis 62 may be zero degrees, one degree, two degrees, five degrees, ten degrees, twenty degrees, or other suitable angles. As used herein, "vacuum" refers to an air pressure that is less than the ambient atmospheric air pressure, and not necessarily 0 pa.

The particle delivery system 40 includes a disc housing 120, a first belt housing 122, and a second belt housing 124. The particle disc 82 is disposed within and configured to rotate within the disc housing 120. The first particle belt 84 is disposed within and configured to rotate within the first belt housing 122. The second particle belt 86 is disposed within and configured to rotate within the second belt housing 124. In certain embodiments, the vacuum passage 110 of the particle metering and singulation unit 44 and the particle hopper 92 (e.g., the particle storage area) are formed within the disc housing 120. Additionally, the particle metering and singulation unit 44 includes the particle disc 82 and the disc housing 120. In certain embodiments, the first belt housing and the second belt housing may be a single belt housing, such that both the first particle belt and the second particle belt may be disposed within and configured to rotate within the single belt housing.

Additionally, the particle delivery system 40 includes a particle tube 130 coupled to the disc housing 120 and the first belt housing 122. The particle tube 130 extends generally from the release point 96 to a particle engagement section 132 (e.g., a first particle engagement section) of the first particle belt 84 and is configured to at least partially direct the particles 80 from the particle disc 82 (e.g., from the release point 96 of the particle disc 82) to the first particle belt 84 (e.g., to the particle engagement section 132 of the first particle belt 84) along the release trajectory 114. As described herein, the particle tube may include any suitable shape and/or configuration configured to at least particle direct the particles, such as a channel, a cylindrical tube, a rectangular tube, and/or other suitable shapes/configurations. In certain embodiments, the particle tube (e.g., particle channel) may be integrally formed with the disc housing and/or the first belt housing. In certain embodiments, the particle tube may be omitted, such that the particles flow from the release point to the engagement point without guidance from the particle tube.

As illustrated, the first particle belt 84 includes the particle engagement section 132 and a particle exit section 134 (e.g., a first particle exit section) at generally opposite end portions of the first particle belt 84. In certain embodiments, the particle engagement section and/or the particle exit section may be at other portions of the first particle belt, such as a side portion extending between the end portions of the first particle belt. The first particle belt 84 is configured to receive the particles 80 from the particle metering and singulation unit 44 at the particle engagement section 132 and to expel the particles 80 toward the second particle belt 86 along a transfer trajectory 136 at the particle exit section 134. Additionally, as illustrated, the second particle belt 86 includes a particle engagement section 138 (e.g., a second particle engagement section) and a particle exit section 140 (e.g., a second particle engagement section) at generally opposite end portions of the second particle belt 86. In some embodiments, the particle engagement section and/or the particle exit section may be at other portions of the second particle belt, such as a side portion extending between the end portions of the second particle belt. The second particle belt 86 is configured to receive the particles 80 from the first particle belt 84 at the particle engagement section 138 and to expel the particles 80 to the trench 31 in soil at the particle exit section 140 and along a release trajectory 142. The first particle belt 84 includes a base 150 (e.g., a first base) and flights 152 (e.g., first flights) coupled to and extending from the base 150, and the second particle belt 86 includes a base 154 (e.g., a second base) and flights 156 (e.g., second flights) coupled to and extending from the base 154. Each pair of opposing flights 152 of the first particle belt 84 is configured to receive a respective particle 80 at the particle engagement section 132 of the first particle belt 84 and to move the respective particle 80 to the particle exit section 134 of the first particle belt 84. Additionally, each pair of opposing flights 156 of the second particle belt 86 is configured to receive a respective particle 80 at the particle engagement section 138 of the second particle belt 86 and to move the respective particle 80 to the particle exit section 140 of the second particle belt 86.

The particle delivery system 40 includes a particle transfer assembly 160 configured to facilitate transfer of the particles 80 from the particle exit section 134 of the first particle belt 84 to the particle engagement section 138 of the second particle belt 86. As illustrated, the particle transfer assembly 160 includes a particle tube 162 configured to at least partially direct the particles 80 from the particle exit section 134 to the particle engagement section 138 to facilitate transferring the particles 80. Additionally, the particle tube 162 is coupled to and extends between the first belt housing 122 and the second belt housing 124.

The air flow system 100 is configured to provide a second air flow 164 from the third air tube 108 and toward the particle tube 162 to accelerate the particles 80 downwardly along the transfer trajectory 136 into the particle tube 162 (e.g., the air flow system 100 may apply a force to the particles 80 via the second air flow 164). In some embodiments, the air flow system 100 may provide the second air flow 164 into and/or through the particle tube 162. Additionally, the particle delivery system 40 is configured to enable the particles 80 to accelerate under the influence of gravity as the particles 80 travel between the first particle belt and the second particle belt 86 (e.g., through the particle tube 162). In certain embodiments, the air flow system or portion(s) of the air flow system may be included from the particle transfer assembly. For example, the particle transfer assembly may include the air flow device, the third air tube, the second air flow provided via the third air tube, or a combination thereof.

As described above, the particle disc 82 is configured to meter the particles 80 and to provide a spacing between the particles 80. Establishing a target spacing between the particles 80 when disposed within the trench 31 may enhance plant development and/or yield. Additionally, the particle delivery system 40 is configured to accelerate the particles 80 generally toward and along the trench 31. The acceleration of the particles 80 by the particle delivery system 40 may reduce a relative ground speed of the particles 80 compared to traditional row units that utilize seed tubes which rely solely on gravity to accelerate the particles 80 for delivery to soil. For example, the particle delivery system 40 is configured to accelerate the particles 80 via the air flow system 100, gravity, the first particle belt 84, and the second particle belt 86.

The air flow system 100 is configured to provide the first air flow 112 from the second air tube 106 to accelerate the particles 80 downwardly along the release trajectory 114 (e.g., the air flow system 100 may apply a force to the particles 80 via the first air flow 112). Additionally, the particle delivery system 40 is configured to enable the particles 80 to accelerate under the influence of gravity as the particles 80 travel between the particle disc 82 and the first particle belt 84. The first particle belt 84 is configured to accelerate the particles 80 received from the particle disc 82, such that a particle transfer speed of the particles 80 expelled from the first particle belt 84 along the transfer trajectory 136 toward the particle engagement section 138 of the second particle belt 86 reaches a target particle transfer speed at the particle engagement section 138. Additionally or alternatively, the second air flow 164 of the particle transfer assembly 160 may accelerate the particles 80, such that the particle transfer speed reaches the target particle transfer speed. The particle transfer speed of the particles 80 may reach the target particle transfer speed when the particle transfer speed is equal to the target particle transfer speed, when the particle transfer speed passes (e.g., becomes greater than or less than) the target particle transfer speed, or when the particle transfer speed is within a threshold range of the target particle transfer speed (e.g., when a difference between the particle transfer speed and the target particle transfer speed is less than a threshold value associated with the threshold range).

The second particle belt 86 is configured to accelerate the particles 80 received from the first particle belt 84, such that a particle exit speed of the particles 80 expelled from the second particle belt 86 along the release trajectory 142 toward the trench 31 reaches a target particle exit speed. The particle exit speed of the particles 80 may reach the target particle exit speed when the particle exit speed is equal to the target particle exit speed, when the particle exit speed passes (e.g., becomes greater than or less than) the target particle exit speed, or when the particle exit speed is within a threshold range of the target particle exit speed (e.g., when a difference between the particle exit speed and the target particle exit speed is less than a threshold value associated with the threshold range). In certain embodiments, the second particle belt 86 is configured to rotate faster than the first particle belt 84 to accelerate the particles 80. For example, the first particle belt 84 may rotate at a first belt speed, and the second particle belt 86 may rotate at a second belt speed, faster than the first belt speed (e.g., the target particle exit speed may be greater than the target particle transfer speed). In some embodiments, the first belt speed of the first particle belt 84 may be generally equal to the second belt speed of the second particle belt 86 (e.g., the target particle transfer speed may be generally equal to the target particle exit speed).

In some embodiments, the particle delivery system may include additional particle belts (e.g., in addition to the first particle belt 84 and the second particle belt 86) configured to accelerate the particles toward and/or along the trench. Each particle belt (from the particle belt adjacent to the hopper to the particle belt adjacent to the trench) may rotate progressively faster, such that each progressive particle belt imparts a greater velocity on each particle as the particle is released from the respective particle belt.

The particle delivery system 40 includes a controller 170 configured to control the rotation rate (e.g., the rotational speed) of the particle disc 82 to adjust/control the spacing between the particles 80. For example, the controller 170 may control a motor 172, which is configured to drive rotation of the particle disc 82, to adjust/control the rotation rate of the particle disc 82 (e.g., by outputting an output signal to the motor 172 indicative of instructions to adjust the rotation rate of the particle disc 82). Additionally, the controller 170 may control the motor 172 to achieve a target spacing between the particles 80. The controller 170 may determine the target spacing between the particles 80 based on a type of the particles 80, a size of the particles 80 (e.g., a nominal size and/or an average size of each particle), an input received from a user interface, or a combination thereof. The spacing may be any suitable spacing, such as one centimeter, two centimeters, five centimeters, ten centimeters, fifty centimeters, one meter, two meters, five meters, etc. In certain embodiments, the controller 170 may control the rotation rate of the particle disc 82 (e.g., via control of the motor 172) to achieve the target spacing based on a reference table identifying rotational speeds of the particle disc 82 that will achieve particular spacings, based on an empirical formula, in response to sensor feedback, or a combination thereof.

In certain embodiments, the controller 170 is configured to control the first air flow 112 provided by the air flow system 100 to adjust/control a particle transfer speed of each particle 80 expelled from the particle disc 82 (e.g., from the release point 96 of the particle disc 82, along the release trajectory 114, and toward the particle engagement section 132 of the first particle belt 84), such that the particle transfer speed reaches a target particle transfer speed at the particle engagement section 132. For example, the controller 170 may control the air flow device 102, which is configured to provide the first air flow 112 to accelerate each particle 80 along the release trajectory 114. In certain embodiments, the controller 170 may control a valve configured to adjust a flow rate of the first air flow 112. The controller 170 may determine the target particle transfer speed of the particles 80 based on the belt speed of the first particle belt 84 and/or the type of the particles 80. The target particle transfer speed may be any suitable speed, such one-tenth kph, one-half kph, one kph, two kph, three kph, five kph, ten kph, fifteen kph, twenty kph, etc. In certain embodiments, the controller 170 may determine the target particle transfer speed as a target percentage of the belt speed of the first particle belt 84 (e.g., thirty percent, fifty percent, seventy percent, eighty percent, ninety percent, ninety-five percent, etc.).

To control the first air flow 112 provided by the air flow system 100, the controller 170 may receive an input signal indicative of the particle transfer speed of the particle 80 at the particle engagement section 132 of the first particle belt 84. For example, the controller 170 may receive the input signal from a particle sensor 178 of the particle delivery system 40 disposed within the particle tube 130. The particle sensor 178 may include an infrared sensor or another suitable type of sensor configured to output the input signal indicative of the particle transfer speed of each particle 80 at the particle engagement section 132. The particle sensor 178 may be positioned a fixed distance from the particle engagement section 132, such that the controller 170 may determine the particle transfer speed of the particle 80 at the particle engagement section 132 based on the fixed distance and the input signal indicative of the particle transfer speed received from the particle sensor 178 (e.g., based on gravitational acceleration of the particle 80 traveling the fixed distance from the particle sensor 178 to the particle engagement section 132 and/or based on acceleration due to the first air flow 112).

The controller 170 may compare the particle transfer speed of the particle 80 at the particle engagement section 132 to the target particle transfer speed to determine whether a difference between the particle transfer speed and the target particle transfer speed exceeds a threshold value. In response to determining that the particle transfer speed at the particle engagement section 132 is less than the target particle transfer speed and the difference between the particle transfer speed and the target particle transfer speed exceeds the threshold value, the controller 170 may output an output signal indicative of instructions to increase the flow rate of the first air flow 112 provided by the air flow system 100 through the second air tube 106. For example, the controller 170 may output the output signal to the air flow device 102 to cause the air flow device 102 to increase the flow rate of the first air flow 112. The increase in the air flow rate may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle engagement section 132 is greater than the target particle transfer speed and the difference between the particle transfer speed and the target particle transfer speed exceeds the threshold value, the controller 170 may output an output signal indicative of instructions to decrease the flow rate of the first air flow 112 provided by the air flow system 100. For example, the controller 170 may output the output signal to the air flow device 102 to cause the air flow device 102 to decrease the flow rate of the first air flow 112. The decrease in the air flow rate may decrease the particle transfer speed, such that the particle transfer speed reaches the target particle transfer speed (e.g., such that the difference between the particle transfer speed and the target particle transfer speed is less than the threshold value).

Additionally, the controller 170 is configured to control the belt speed of the first particle belt 84 to adjust/control the particle transfer speed of the particles 80 expelled from the particle exit section 134 of the first particle belt 84, such that the particle transfer speed reaches a target particle transfer speed at the particle engagement section 138 of the second particle belt 86. For example, the controller 170 may control a wheel 174, via a motor 176 which is configured to drive rotation of the first particle belt 84, to adjust/control the belt speed of the first particle belt 84 (e.g., by outputting an output signal to the motor 176 indicative of instructions to adjust the belt speed of the first particle belt 84), thereby enabling the controller 170 to adjust/control the particle transfer speed of the particles 80. The controller 170 may control the particle transfer speed of the particles 80, such that the particle transfer speed reaches the target particle transfer speed. The controller 170 may determine the target particle transfer speed of the particles 80 based on the type of the particles 80, a size of the particles 80 (e.g., a nominal size and/or an average size of each particle), an input received from a user interface, the ground speed of the row unit, or a combination thereof. The target particle transfer speed may be any suitable speed, such one kilometer per hour (kph), two kph, three kph, five kph, ten kph, fifteen kph, twenty kph, etc. In certain embodiments, the controller 170 may determine the target particle transfer speed as a target percentage of a belt speed of the second particle belt 86 (e.g., a second belt speed) or of the ground speed of the row unit (e.g., thirty percent, fifty percent, seventy percent, eighty percent, ninety percent, ninety-five percent, etc.).

To control the belt speed of the first particle belt 84, the controller 170 may receive an input signal indicative of the particle transfer speed of the particle 80 at the particle engagement section 138 of the second particle belt 86. For example, the controller 170 may receive the input signal from a particle sensor 180 of the particle delivery system 40 disposed proximate to the particle engagement section 138 and along the transfer trajectory 136. The particle sensor 180 may include an infrared sensor or another suitable type of sensor configured to output the input signal indicative of the particle transfer speed of each particle 80 at the particle engagement section 138. The particle sensor 180 may be positioned a fixed distance from the particle engagement section 138, such that the controller 170 may determine the particle transfer speed of the particle 80 at the particle engagement section 138 based on the fixed distance and the input signal indicative of the particle transfer speed received from the particle sensor 180 (e.g., based on acceleration and/or deceleration of the particle 80 traveling the fixed distance and/or based on acceleration due to the second air flow 164). As illustrated, the particle sensor 180 is disposed within the particle tube 162. In certain embodiments, the particle sensor may be partially or entirely disposed with the first belt housing or the second belt housing.

The controller 170 may compare the particle transfer speed of the particle 80 at the particle engagement section 138 to the target particle transfer speed to determine whether a difference between the particle transfer speed and the target particle transfer speed exceeds a threshold value. In response to determining that the particle transfer speed at the particle engagement section 138 is less than the target particle transfer speed and the difference between the particle transfer speed and the target particle transfer speed exceeds the threshold value, the controller 170 may output an output signal indicative of instructions to increase the belt speed of the first particle belt 84. For example, the controller 170 may output the output signal to the motor 176 to cause the motor 176 to increase the belt speed of the first particle belt 84. The increase in the belt speed of the first particle belt 84 may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle engagement section 138 is greater than the target particle transfer speed and the difference between the particle transfer speed and the target particle transfer speed exceeds the threshold value, the controller 170 may output an output signal indicative of instructions to decrease the belt speed of the first particle belt 84. For example, the controller 170 may output the output signal to the motor 176 to cause the motor 176 to decrease the belt speed of the first particle belt 84. The decrease in the belt speed of the first particle belt 84 may decrease the particle transfer speed, such that the particle transfer speed reaches the target particle transfer speed (e.g., such that the difference between the particle transfer speed and the target particle transfer speed is less than the threshold value).

In some embodiments, the controller 170 is configured to control the second air flow 164 provided by the air flow system 100, to adjust/control the particle transfer speed of the particles 80 expelled from the particle exit section 134 of the first particle belt 84, such that the particle transfer speed reaches the target particle transfer speed (e.g., in addition to or as an alternative to controlling the first belt speed of the first particle belt 84). For example, the controller 170 may control the second air flow 164 by outputting an output signal to the air flow device 102 indicative of instructions to adjust a flow rate of the second air flow 164, thereby enabling the controller 170 to adjust/control the particle transfer speed of the particles 80.

To control the second air flow 164, the controller 170 may compare the particle transfer speed of the particle 80 at the particle engagement section 138 to the target particle transfer speed to determine whether a difference between the particle transfer speed and the target particle transfer speed exceeds a threshold value. In response to determining that the particle transfer speed at the particle engagement section 138 is less than the target particle transfer speed and the difference between the particle transfer speed and the target particle transfer speed exceeds the threshold value, the controller 170 may output an output signal indicative of instructions to increase the flow rate of the second air flow 164. For example, the controller 170 may output the output signal to the air flow device 102 to cause the air flow device 102 to increase the flow rate of the second air flow 164. The increase in the flow rate of the second air flow 164 may increase the particle transfer speed, such that the particle transfer speed reaches the target particle transfer speed.

In response to determining that the particle transfer speed at the particle engagement section 138 of the second particle belt 86 is greater than the target particle transfer speed and the difference between the particle transfer speed and the target particle transfer speed exceeds the threshold value, the controller 170 may output an output signal indicative of instructions to decrease the flow rate of the second air flow 164. For example, the controller 170 may output the output signal to the air flow device 102 to cause the air flow device 102 to decrease the flow rate of the second air flow 164. The decrease in the flow rate of the second air flow 164 may decrease the particle transfer speed, such that the particle transfer speed reaches the target particle transfer speed.

Furthermore, the controller 170 is configured to control the belt speed of the second particle belt 86 to adjust/control the particle exit speed of the particles 80 expelled from the second particle belt 86 (e.g., from the particle exit section 140 of the second particle belt 86, along the release trajectory 142, and toward and/or along the trench 31), such that the particle exit speed reaches a target particle exit speed. For example, the controller 170 may control a wheel 182, via a motor 184 which is configured to drive rotation of the second particle belt 86, to adjust/control the belt speed of the second particle belt 86 (e.g., by outputting an output signal to the motor 184 indicative of instructions to adjust the belt speed of the second particle belt 86), thereby enabling the controller 170 to adjust/control the particle exit speed of the particles 80. The controller 170 may control the particle exit speed of the particles 80, such that the particle exit speed reaches the target particle exit speed. The controller 170 may determine the target particle exit speed of the particles 80 based on the type of the particles 80, a size of the particles 80 (e.g., a nominal size and/or an average size of each particle), an input received from a user interface, the ground speed of the row unit, or a combination thereof. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, seventy percent, eighty percent, ninety percent, ninety-five percent, one hundred percent, etc.).

To control the belt speed of the second particle belt 86, the controller 170 may receive an input signal indicative of the particle exit speed of the particle 80 at the particle exit section 140 of the second particle belt 86. For example, the controller 170 may receive the input signal from a particle sensor 186 of the particle delivery system 40 disposed proximate to the particle exit section 140 and along the release trajectory 142. The particle sensor 186 may include an infrared sensor or another suitable type of sensor configured to output the input signal indicative of the particle exit speed of each particle 80 at the particle exit section 140. The particle sensor 186 may be positioned a fixed distance from the particle exit section 140, such that the controller 170 may determine the particle exit speed of the particle 80 at the particle exit section 140 based on the fixed distance and the input signal indicative of the particle exit speed received from the particle sensor 186 (e.g., based on acceleration and/or deceleration of the particle 80 traveling the fixed distance). In certain embodiments, the particle sensor 186 may be configured output a signal indicative of the ground speed of the agricultural row unit to the controller 170, and/or the controller 170 may receive the signal indicative of the ground speed from another source. In some embodiments, the particle sensor 178, the particle sensor 180, the particle sensor 186, or a combination thereof may be omitted from the particle delivery system 40.

The controller 170 may compare the particle exit speed of the particle 80 at the particle exit section 140 to the target particle exit speed to determine whether a difference between the particle exit speed and the target particle exit speed exceeds a threshold value. In response to determining that the particle exit speed at the particle exit section 140 is less than the target particle exit speed and the difference between the particle exit speed and the target particle exit speed exceeds the threshold value, the controller 170 may output an output signal indicative of instructions to increase the belt speed of the second particle belt 86. For example, the controller 170 may output the output signal to the motor 184 to cause the motor 184 to increase the belt speed of the second particle belt 86. The increase in the belt speed of the second particle belt 86 may increase the particle exit speed, such that the particle exit speed reaches the target particle exit speed (e.g., such that the difference between the particle exit speed and the target particle exit speed is less than the threshold value).

In response to determining that the particle exit speed at the particle exit section 140 of the second particle belt 86 is greater than the target particle exit speed and the difference between the particle exit speed and the target particle exit speed exceeds the threshold value, the controller 170 may output an output signal indicative of instructions to decrease the belt speed of the second particle belt 86. For example, the controller 170 may output the output signal to the motor 184 to cause the motor 184 to decrease the belt speed of the second particle belt 86. The decrease in the belt speed of the second particle belt 86 may decrease the particle exit speed, such that the particle exit speed reaches the target particle exit speed (e.g., such that the difference between the particle exit speed and the target particle exit speed is less than the threshold value).

As illustrated, the controller 170 of the particle delivery system 40 includes a processor 190 and a memory 192. The processor 190 (e.g., a microprocessor) may be used to execute software, such as software stored in the memory 192 for controlling the particle delivery system 40 (e.g., for controlling the rotation rate of the particle disc 82, the belt speeds of the first particle belt 84 and the second particle belt 86, and the first air flow 112 and the second air flow 164 provided by the air flow system 100, etc.). Moreover, the processor 190 may include multiple microprocessors, one or more "general-purpose" microprocessors, one or more special-purpose microprocessors, and/or one or more application specific integrated circuits (ASICS), or some combination thereof. For example, the processor 190 may include one or more reduced instruction set (RISC) or complex instruction set (CISC) processors.

The memory device 192 may include a volatile memory, such as random access memory (RAM), and/or a nonvolatile memory, such as read-only memory (ROM). The memory device 192 may store a variety of information and may be used for various purposes. For example, the memory device 192 may store processor-executable instructions (e.g., firmware or software) for the processor 190 to execute, such as instructions for controlling the particle delivery system 40. In certain embodiments, the controller 170 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the target particle transfer speed(s) and the target particle exit speed), instructions (e.g., software or firmware for controlling the particle delivery system 40), and any other suitable data. The processor 190 and/or the memory device 192, and/or an additional processor and/or memory device, may be located in any suitable portion of the system. For example, a memory device for storing instructions (e.g., software or firmware for controlling portions of the particle delivery system 40) may be located in or associated with the particle delivery system 40.

Additionally, the particle delivery system 40 includes a user interface 194 that is communicatively coupled to the controller 170. The user interface 194 may be configured to inform an operator of the particle transfer speed(s) of the particles 80, the particle exit speed of the particles 80, to enable the operator to adjust the rotation rate of the particle disc 82 and/or the spacing between the particles 80, to enable the operator to adjust the belt speeds of the first particle belt 84 and the second particle belt 86 and/or the acceleration of the particles 80, to enable the operator to adjust the first air flow 112 and the second air flow 164 provided by the air flow system 100, to provide the operator with selectable options of the type of particles 80, and to enable other operator interactions. For example, the user interface 194 may include a display and/or other user interaction devices (e.g., buttons) configured to enable operator interactions.

In certain embodiments, the controller 170 may determine other information related to the particles 80 based on feedback from the sensor 186, such as skips (e.g., the particle 80 not being present during an expected time period), multiple particles 80 (e.g., multiple particles 80 being present when only a single particle 80 is expected), an amount of particles 80 deposited over a given area (e.g., an amount of particles 80 deposited per acre), and other information related to the particles 80. In some embodiments, the controller 170 may control the particle delivery system based on such determinations.

Figure 4:
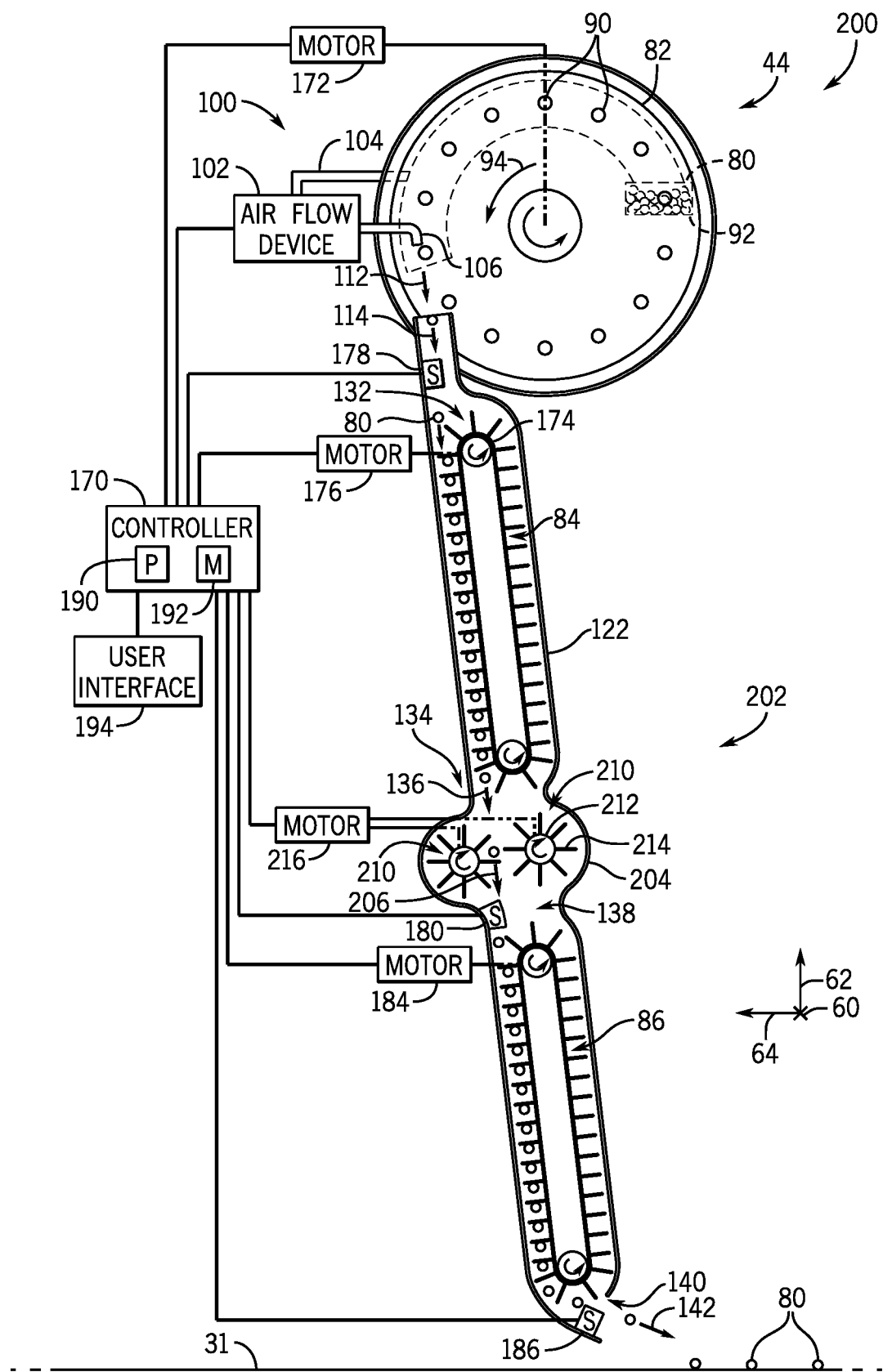
FIG. 4 is a side view of another embodiment of a particle delivery system that may be employed within the row unit of FIG. 2, in accordance with an aspect of the present disclosure.

FIG. 4 is a side view of another embodiment of a particle delivery system 200 that may be employed within the row unit of FIG. 2. As illustrated, the particle delivery system 200 includes the particle metering and singulation unit 44, which includes the particle disc 82, configured to meter and establish the spacing between the particles 80. The particle delivery system 200 also includes the first particle belt 84 configured to receive the particles from the particle metering and singulation unit 44 and to expel the particles 80 to the second particle belt 86. Additionally, the particle delivery system 200 includes the second particle belt 86 configured to receive the particles 80 from the first particle belt 84 and to expel the particles 80 to the trench 31. Further, the particle delivery system 200 includes the air flow system 100 configured to provide the vacuum along the vacuum passage 110 adjacent to the particle disc 82, and to remove the particles 80 from the particle disc 82 and accelerate the particles 80 along the release trajectory 114 using the first air flow 112.

The particle delivery system 200 includes a particle transfer assembly 202 disposed generally between the particle exit section 134 of the first particle belt 84 and the particle engagement section 138 of the second particle belt 86. The particle transfer assembly 202 includes a particle transfer housing 204 coupled to the first belt housing 122 and to the second belt housing 124. The particle transfer assembly 202 is configured to accelerate and at least partially direct the particles 80 toward the particle engagement section 138 along a transfer trajectory 206.

The particle transfer assembly 202 includes guide wheels 210 configured to rotate (e.g., in opposite directions) to drive the particles 80 downwardly along the transfer trajectory 206. For example, each guide wheel 210 includes a wheel base 212 (e.g., a wheel, a gear, etc.) and paddles 214 coupled to the wheel base 212. The wheel base 212 is configured to rotate to drive rotation of the paddles 214. The paddles 214 are configured to contact the particles 80 flowing between the guide wheels 210. As a paddle 214 contacts a respective particle 80, the paddle 214 directs the particle 80 along the transfer trajectory 206. Additionally, the paddles 214 are configured to accelerate the particles 80, such that the particle transfer speed of the particles 80 reaches the target particle transfer speed. The paddles 214 may be formed from a resilient and flexible material (e.g., rubber, plastic, fabric, other materials, or a combination thereof) that enables the paddles 214 to flex in response to contact with the particles 80 and/or in response to rotation of the guide wheels 210. In certain embodiments, the particle delivery system may include more or fewer guide wheels disposed generally between the particle discs and configured to guide and to accelerate the particles along the transfer trajectory (e.g., zero guide wheels, one guide wheel, three guide wheels, four guide wheels, six guide wheels, ten guide wheels, etc.).

In certain embodiments, the controller 170 is configured to control a rotation rate of the guide wheels 210 to adjust/control the particle transfer speed of the particles 80 along the transfer trajectory 206 and toward the particle engagement section 138 of the second particle belt 86, such that the particle transfer speed reaches a target particle transfer speed at the particle engagement section 138. To control the rotation rate of the guide wheels 210, the controller 170 may receive an input signal indicative of the particle transfer speed of the particle 80 at the particle engagement section 138. For example, the controller 170 may receive the input signal from the particle sensor 180 of the particle delivery system 40 disposed within the particle transfer housing 204 proximate to the guide wheels 210. The particle sensor 180 may be positioned a fixed distance from the particle engagement section 138, such that the controller 170 may determine the particle transfer speed of the particle 80 at the particle engagement section 138 based on the fixed distance and the input signal indicative of the particle transfer speed received from the particle sensor 180.

The controller 170 may compare the particle transfer speed of the particle 80 at the particle engagement section 138 to the target particle transfer speed to determine whether a difference between the particle transfer speed and the target particle transfer speed exceeds a threshold value. In response to determining that the particle transfer speed at the particle engagement section 138 is less than the target particle transfer speed and the difference between the particle transfer speed and the target particle transfer speed exceeds the threshold value, the controller 170 may output an output signal indicative of instructions to increase the rotation rate of the guide wheels 210. For example, the controller 170 may output the output signal to a motor 216 of the particle delivery system 200 coupled to and configured to drive rotation of the wheel base 212 of each guide wheel 210 to cause the motor 216 to increase the rotation rate of each guide wheel 210. The increase in the rotation rate of the guide wheels 210 may increase the particle transfer speed, such that the particle transfer speed reaches the target particle transfer speed (e.g., such that the difference between the particle transfer speed and the target particle transfer speed is less than the threshold value). In certain embodiments, the particle delivery system may include an additional motor (e.g., two motors) with each motor configured to drive rotation of a respective guide wheel. The controller may control each motor to control the rotation rate of each guide wheel.

In response to determining that the particle transfer speed at the particle engagement section 138 is greater than the target particle transfer speed and the difference between the particle transfer speed and the target particle transfer speed exceeds the threshold value, the controller 170 may output an output signal indicative of instructions to decrease the rotation rate of the guide wheels 210. For example, the controller 170 may output the output signal to the motor 216 to cause the motor 216 to decrease the rotation rate of each guide wheel 210. The decrease in the rotation rate of the guide wheels 210 may decrease the particle transfer speed, such that the particle transfer speed reaches the target particle transfer speed (e.g., such that the difference between the particle transfer speed and the target particle transfer speed is less than the threshold value).

Figure 5:
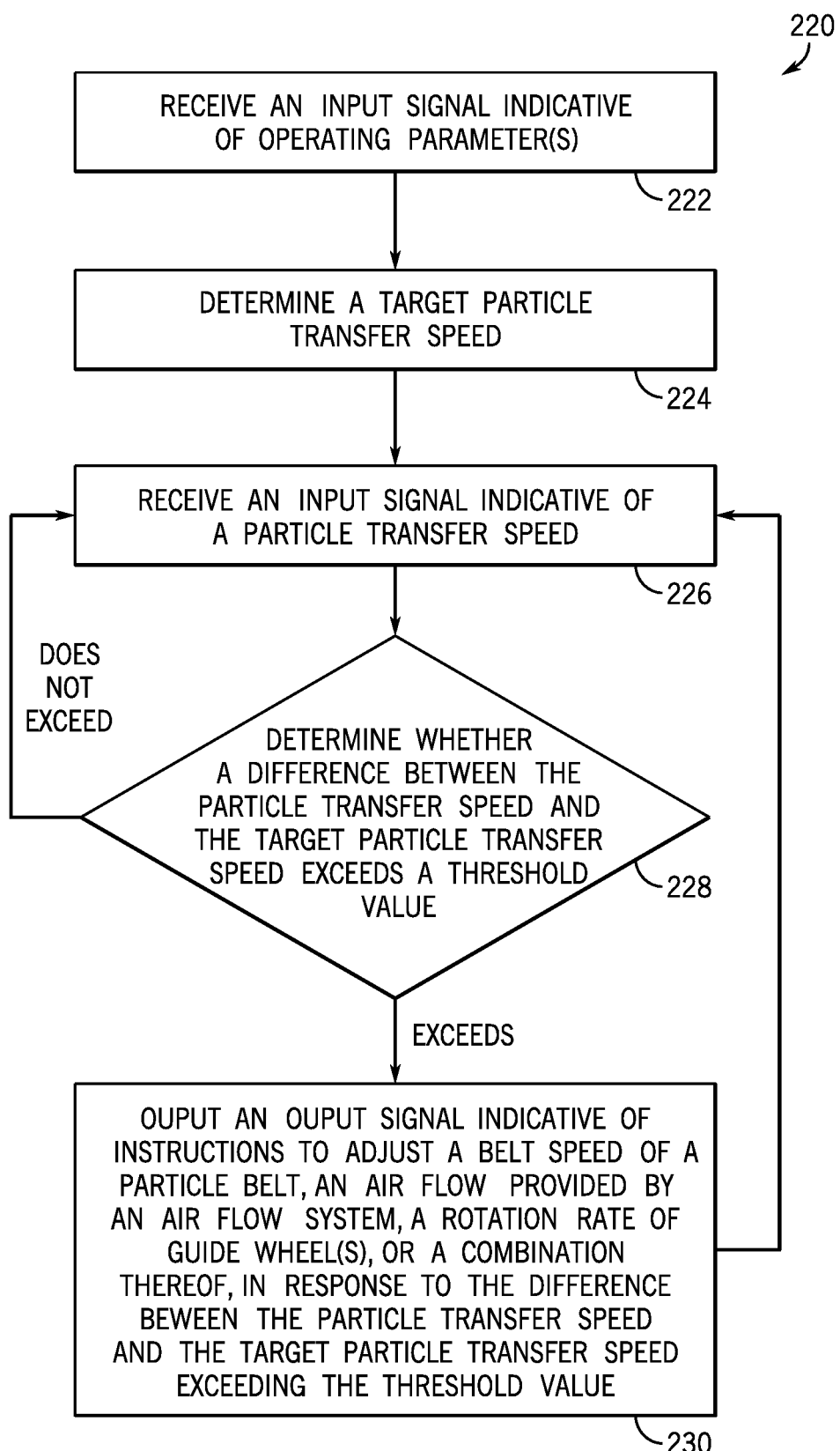
FIG. 5 is a flow diagram of an embodiment of a process for controlling a particle delivery system, in accordance with an aspect of the present disclosure.

FIG. 5 is a flow diagram of an embodiment of a process 220 for controlling a particle delivery system. The process 220, or portions thereof, may be performed by the controller of the particle delivery system. The process 220 begins at block 222, in which an input signal indicative of operating parameter(s) is received. For example, the operating parameters may include the type of the particles, the ground speed of the row unit, a spacing between flights of one or more particle belts, a size of the particles, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 224, the target particle transfer speed is determined. For example, the controller may determine the target particle transfer speed of the particles based on the type of the particles, the belt speed of the second particle belt (e.g., the second particle belt having the particle engagement section configured to receive the particles traveling at the particle transfer speed), the spacing between flight of the second particle belt, the size of the particles, and/or other operating parameters. At block 226, an input signal indicative of the particle transfer speed of the particle at the particle engagement section of the second particle belt is received. For example, the controller may receive the input signal indicative of the particle transfer speed from the particle sensor disposed proximate to the particle engagement section. In certain embodiments, the controller may receive multiple input signals from the particle sensor, in which each input signal is indicative of a particle transfer speed of a respective particle. The controller may determine an average of the multiple particle transfer speeds to determine the average particle transfer speed of the particles at the particle engagement section. As such, the controller may account for variance among the particle transfer speeds of multiple particles at the particle engagement section to reduce excessive control actions (e.g., adjustments to the belt speed of the first particle belt, the second air flow provided by the air flow system, the or rotation rate of the guide wheels, or a combination thereof).

At block 228, a determination of whether a difference between the particle transfer speed and the target particle transfer speed exceeds a threshold value is made (e.g., by the controller). Additionally, a determination of whether the particle transfer speed is less than or greater than the target particle transfer speed is made (e.g., by the controller). The threshold value may be determined based on the type of the particles and/or the belt speed of the second particle belt. In response to the difference exceeding the threshold, the process 220 proceeds to block 230. In response to the difference not exceeding the threshold, the process 220 returns to block 226 and receives the next input signal indicative of the particle transfer speed.

At block 230, in response to the difference between the particle transfer speed and the target particle transfer speed exceeding the threshold value, an output signal indicative of instructions to adjust the belt speed of the first particle belt, the second air flow provided by the air flow system, the rotation rate of the guide wheels, or a combination thereof, is output by the controller. For example, the controller may output the output signal indicative of instructions to increase the belt speed of the first particle belt in response to a determination that the particle transfer speed is less than the target particle transfer speed and the difference between the particle transfer speed and the target particle transfer speed exceeds the threshold value, or the controller may output the output signal indicative of instructions to decrease the belt speed of the first particle belt in response to a determination that the particle transfer speed is greater than the target particle transfer speed and the difference between the particle transfer speed and the target particle transfer speed exceeds the threshold value. In embodiments with the second air flow provided by the air flow system, the controller may output the output signal indicative of instructions to increase the flow rate of the second air flow in response to the determination that the particle transfer speed is less than the target particle transfer speed and the difference between the particle transfer speed and the target particle transfer speed exceeds the threshold value, or the controller may output the output signal indicative of instructions to decrease the flow rate of the second air flow in response to the determination that the particle transfer speed is greater than the target particle transfer speed and the difference between the particle transfer speed and the target particle transfer speed exceeds the threshold value. In embodiments with the guide wheels of the particle transfer assembly, the controller may output the output signal indicative of instructions to increase the rotation rate of the guide wheels in response to the determination that the particle transfer speed is less than the target particle transfer speed and the difference between the particle transfer speed and the target particle transfer speed exceeds the threshold value, or the controller may output the output signal indicative of instructions to decrease the rotation rate of the guide wheels in response to the determination that the particle transfer speed is greater than the target particle transfer speed and the difference between the particle transfer speed and the target particle transfer speed exceeds the threshold value.

In certain embodiments, the controller may determine whether the particle transfer speed is within a first threshold value of the target particle transfer speed and whether the particle transfer speed is within a second threshold value of the target particle transfer speed. For example, in response to the difference between the particle transfer speed and the target particle transfer speed exceeding a first threshold value, the controller may perform a first control action, such as adjusting the belt speed of the first particle belt. In response to the difference between the particle transfer speed and the target particle transfer speed exceeding a second threshold value, smaller than the first threshold value (e.g., the second threshold value being a smaller range of the target particle transfer speed, as compared to the first threshold value), the controller may perform a second control action (e.g., in addition to or in place of the first control action), such as adjusting the flow rate of the second air flow provided by the air flow system and/or the rotation rate of the guide wheels.

After completing block 230, the process 220 returns to block 226 and receives the next input signal indicative of the particle transfer speed of the particle at the particle engagement section of the second particle belt. The next determination is made of whether the difference between the particle transfer speed and the target particle transfer speed exceeds the threshold value (e.g., block 228), and the belt speed of the second particle belt, the flow rate of the second air flow, the rotation rate of the guide wheels, or the combination thereof, may be adjusted in response to the determination. As such, blocks 226-230 of the process 220 may be iteratively performed (e.g., by the controller of the particle delivery system and/or by another suitable controller) to facilitate acceleration of the particles to the target particle transfer speed and transfer of the particles between the first and second particle belts. In some embodiments, certain blocks of the blocks 222-230 may be omitted from the process 220, and/or the order of the blocks 222-230 may be different.

Figure 6:
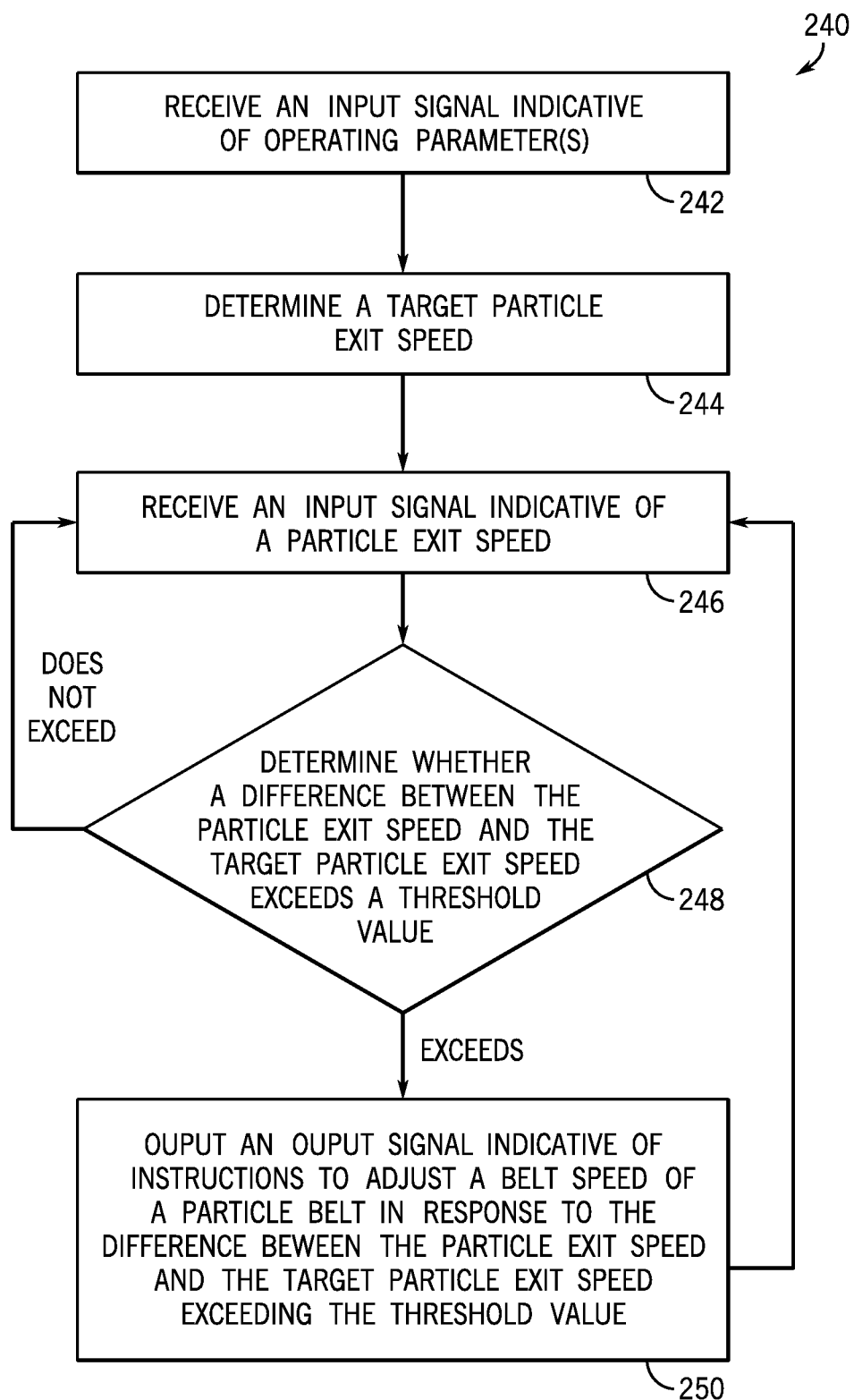
FIG. 6 is a flow diagram of an embodiment of a process for controlling a particle delivery system, in accordance with an aspect of the present disclosure.

FIG. 6 is a flow diagram of an embodiment of a process 240 for controlling a particle delivery system. The process 240, or portions thereof, may be performed by the controller of the particle delivery system. The process 240 begins at block 242, in which an input signal indicative of operating parameter(s) is received. For example, the operating parameters may include the type of the particles, the ground speed of the row unit, a spacing between flights of one or more particle belts, a size of the particles, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 244, the target particle exit speed is determined. For example, the controller may determine the target particle exit speed of the particles based on the type of the particles, the ground speed of the row unit, the size of the particles, and/or other operating parameters. At block 246, an input signal indicative of the particle exit speed of the particle at the particle exit section of the second particle belt is received. For example, the controller may receive the input signal indicative of the particle exit speed from the particle sensor disposed proximate to the particle exit section of the second particle belt. In certain embodiments, the controller may receive multiple input signals from the particle sensor, in which each input signal is indicative of a particle exit speed of a respective particle. The controller may determine an average of the multiple particle exit speeds to determine the average particle exit speed of the particles at the particle exit section. As such, the controller may account for variance among the particle exit speeds of multiple particles at the particle exit section to reduce excessive control actions (e.g., adjustments to the belt speed of the second particle belt).

At block 248, a determination of whether a difference between the particle exit speed and the target particle exit speed exceeds a threshold value is made (e.g., by the controller). Additionally, a determination of whether the particle exit speed is less than or greater than the target particle exit speed is made (e.g., by the controller). The threshold value may be determined based on the type of the particles, the ground speed of the row unit, and/or other factors. In response to the difference exceeding the threshold, the process 240 proceeds to block 250. In response to the difference not exceeding the threshold, the process 240 returns to block 246 and receives the next input signal indicative of the particle exit speed.

At block 250, in response to the difference between the particle exit speed and the target particle exit speed exceeding the threshold value, an output signal indicative of instructions to adjust the belt speed of the second particle belt is output to the motor configured to drive rotation of the second particle belt (e.g., the motor configured to drive rotation of the wheel coupled to and configured to drive rotation of the second particle belt). For example, the controller may output the output signal indicative of instructions to increase the belt speed of the second particle belt in response to a determination that the particle exit speed is less than the target particle exit speed and the difference between the particle exit speed and the target particle exit speed exceeds the threshold value. Further, the controller may output the output signal indicative of instructions to decrease the belt speed of the second particle belt in response to a determination that the particle exit speed is greater than the target particle exit speed and the difference between the particle exit speed and the target particle exit speed exceeds the threshold value.

After completing block 250, the process 240 returns to block 246 and receives the next input signal indicative of the particle exit speed of the particle at the particle exit section of the second particle belt. The next determination is made of whether the difference between the particle exit speed and the target particle exit speed exceeds the threshold value (e.g., block 248), and the belt speed of the second particle belt may be adjusted in response to the determination. As such, blocks 246-250 of the process 240 may be iteratively performed (e.g., by the controller of the particle delivery system and/or by another suitable controller) to facilitate acceleration of the particles to the target particle exit speed. In some embodiments, certain blocks of the blocks 242-250 may be omitted from the process 240, and/or the order of the blocks 242-250 may be different.

Figure 7:
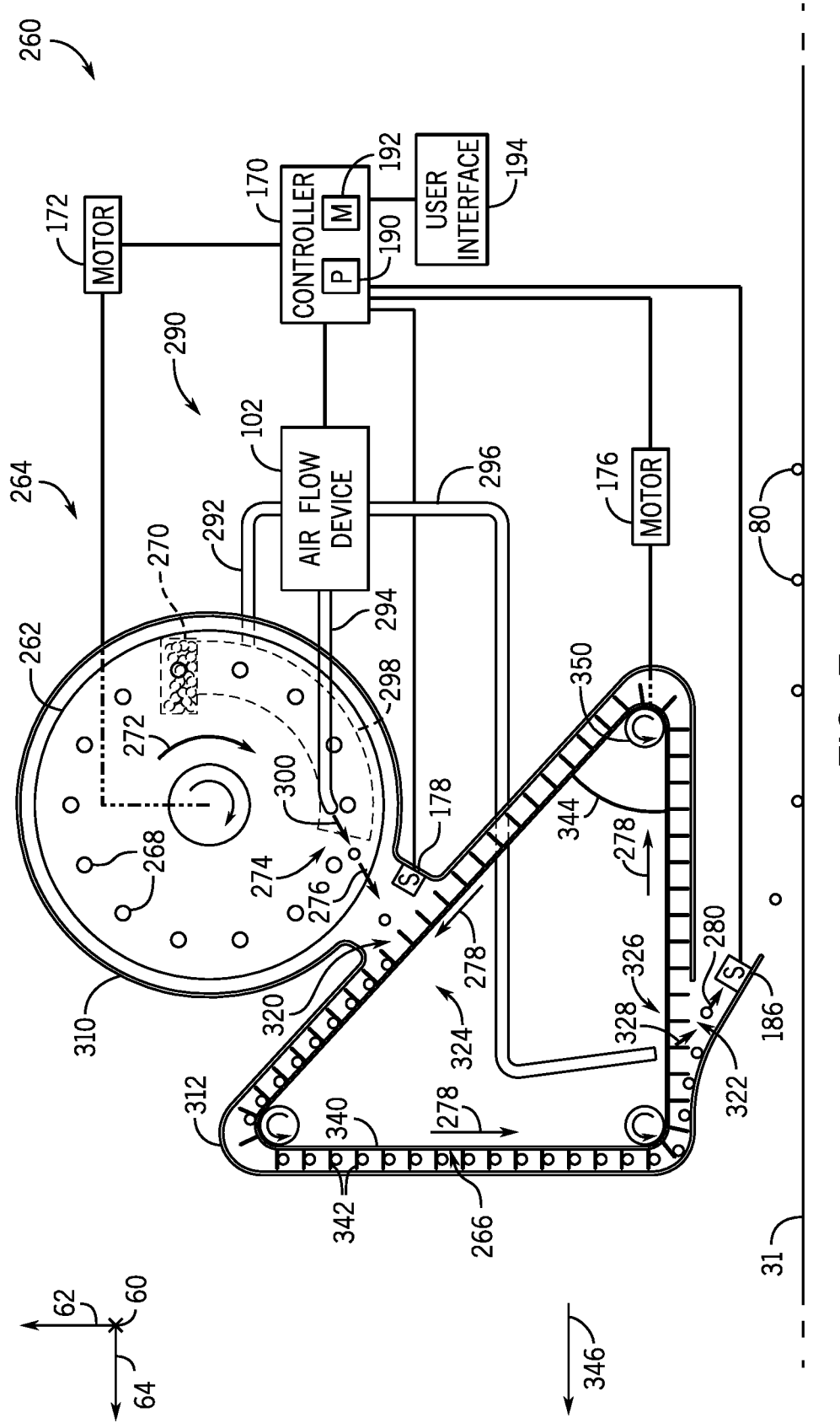
FIG. 7 is a side view of another embodiment of a particle delivery system that may be employed within the row unit of FIG. 2, in accordance with an aspect of the present disclosure.

FIG. 7 is a side view of another embodiment of a particle delivery system 260 that may be employed within the row unit of FIG. 2. The particle delivery system 260 is configured to meter and accelerate the particles 80 toward the trench 31 for deposition into the trench 31. In the illustrated embodiment, the particle delivery system 260 includes a particle disc 262 (e.g., of a particle metering and singulation unit 264) configured to meter the particles 80 and a particle belt 266 (e.g., an endless member) configured to receive the particles 80 from the particle disc 262 and to accelerate and move the particles 80 toward the trench 31.

The particle disc 262 has apertures 268 configured to receive the particles 80 from a particle hopper 270 of the particle delivery system 260. For example, each aperture 268 may receive a single particle 80. The particle hopper 270 is a particle storage area configured to store the particles 80 for subsequent metering and distribution. In certain embodiments, the particle hopper 270 may be coupled to and/or included as part of a housing of the particle metering and singulation unit 264. Furthermore, in some embodiments, a hopper assembly may provide the particles 80 to the particle hopper 270, and/or the hopper assembly (e.g., the hopper of the hopper assembly) may be coupled to the particle hopper 270. The particle disc 262 is configured to rotate, as indicated by arrow 272, to move the particles 80 from the particle hopper 270 to a release point 274, where the particles 80 are released such that the particles 80 move downwardly toward the particle belt 266 along a transfer trajectory 276. The particle belt 266 is configured to rotate, as indicated by arrows 278, to move the particles 80 toward the trench 31 and to expel the particles 80 into the trench 31 along a release trajectory 280.

The disc 262 having the apertures 268 may be any suitable shape configured to rotate/move to transfer the particles 80 from the particle hopper 270 to the release point 274. For example, the disc 262 may be generally flat, may have a curved portion and a flat portion, may be entirely curved, may be a drum, or may include other suitable shapes, geometries, and/or configurations. In certain embodiments, an inner portion of the disc 262 may curved/raised related to an outer portion of the disc 262 having the apertures 268 (e.g., the disc 262 may be generally bowl-shaped), such that the particles 80 may be directed toward the apertures 268 (e.g., away from the raised inner portion and/or toward the flat outer portion) as the disc 262 rotates. In some embodiments, the disc 262 may be a drum having the apertures 268 disposed along an outer portion and/or an exterior of the drum.

As illustrated, the particle delivery system 260 includes an air flow system 290 having the air flow device 102, a first air tube 292 fluidly coupled to the air flow device 102, a second air tube 294 fluidly coupled to the air flow device 102, and a third air tube 296 fluidly coupled to the air flow device 102. The air flow system 290 is configured to reduce the air pressure within a vacuum passage 298 positioned along a portion of the particle disc 262, thereby drawing the particles 80 from the particle hopper 270 toward and against the apertures 268. As illustrated, the first air tube 292 is fluidly coupled to the air flow device 102 and to the vacuum passage 298. The air flow device 102 is configured to draw air through the apertures 268 aligned with the vacuum passage 298, via the first air tube 292. As the particle disc 262 rotates, the vacuum formed at the apertures 268 secures the particles 80 to the particle disc 262 at the apertures 268, such that the particle disc 262 moves each particle 80 from the particle hopper 270 to the release point 274. At the release point 274, the air flow system 290 provides, via the second air tube 294, a first air flow 300 configured to remove each particle 80 from the respective aperture 268 (e.g., by overcoming the vacuum formed at the respective aperture 268). In certain embodiments, the first air flow 300 may be omitted, and the particles 80 may be released from the apertures 268 due to the vacuum passage 298 ending. For example, at the release point 274, the vacuum passage 298 may end (e.g., the air flow device 102 may no longer draw air through the apertures 268 of the particle disc 262 at the release point 274), and the particles 80 may no longer be secured in the apertures 268. Rotation of the particle disc 82 imparts a velocity on the particles 80, and the particles 80 accelerate downwardly along the transfer trajectory 276 under the influence of gravity. In some embodiments, an angle between the transfer trajectory 276 and the vertical axis 62 may be zero degrees, one degree, two degrees, five degrees, ten degrees, twenty degrees, thirty degrees, forty-five degrees, sixty degrees, seventy-five degrees, eighty-five degrees, ninety degrees, or other suitable angles. As used herein, "vacuum" refers to an air pressure that is less than the ambient atmospheric air pressure, and not necessarily 0 pa.

The particle delivery system 260 includes a disc housing 310 and a belt housing 312. The particle disc 262 is disposed within and configured to rotate within the disc housing 310. The particle belt 266 is disposed within and configured to rotate within the belt housing 312. In certain embodiments, the vacuum passage 298 of the particle metering and singulation unit 264 and the particle hopper 270 (e.g., the particle storage area) are formed within the disc housing 310. Additionally, the particle metering and singulation unit 44 includes the particle disc 262 and the disc housing 310.

The belt housing 312 has a particle reception aperture 320 and a particle exit aperture 322. The particle belt 266 is configured to receive the particles 80 at a particle engagement section 324 of the particle belt 266. Accordingly, the particles 80 flow from the release point 274, along the transfer trajectory 276, through the particle reception aperture 320, and to the particle engagement section 324. In certain embodiments, the air flow system 290 may provide the first air flow 300 through the particle reception aperture 320 to accelerate the particles 80 from the particle disc 262 toward the particle belt 266. Further, the particle belt 266 is configured to expel the particles 80 at a particle exit section 326 of the particle belt 266. Accordingly, the particles 80 flow from the particle exit section 326, along the release trajectory 280, through the particle exit aperture 322, and toward the trench 31 in soil. In some embodiments, the air flow system 290 is also configured to provide a second air flow 328 from the third air tube 296 to accelerate the particles 80 along the release trajectory 280 (e.g., the air flow system 290 may apply a force to the particles 80 via the second air flow 328). The air flow system 290 provides the second air flow 328 through the particle exit aperture 322 to accelerate the particles 80 away from the particle exit section 326 of the particle belt 266 and toward the trench 31. In some embodiments, the air flow system or portion(s) of the air flow system may be omitted from the particle delivery system. For example, the particle delivery system may only include the air flow device, the first air tube, and the third air tube. Alternatively, the air flow system may be entirely omitted from the particle delivery system.

Additionally, the particle belt 266 includes a base 340 and flights 342 coupled to and extending from the base 340. Each pair of opposing flights 342 of the particle belt 266 is configured to receive a respective particle 80 at the particle engagement section 324 and to move the respective particle 80 to the particle exit section 326.

The particle belt 266 extends generally parallel to the trench 31 at the particle exit section 326, which may facilitate deposition of the particles 80 into the trench 31. For example, as described in greater detail below, a belt speed of the particle belt 266 may be controlled to generally match a ground speed of the row unit having the particle delivery system 260, which may enable the particles 80 to be deposited into the trench 31 at a speed (e.g., a speed relative to the trench 31) that is zero or that is negligible. The zero/negligible speed of the particles 80 relative to the trench 31 may enable consistent placement of the particles 80 within the trench and/or a softer impact between the particles 80 and soil within the trench 31. In certain embodiments, the particle belt at the particle exit section may extend at an angle relative to the trench (e.g., one degree, two degrees, five degrees, ten degrees, twenty degrees, forty-five degrees, between zero degrees and five degrees, between zero degrees and ten degrees, between five degrees and twenty degrees, between ten degrees and forty-five degrees, etc.). Additionally, the particle belt 266 at the particle engagement section 324 extends at an angle 344 of about forty-five degrees relative to the particle belt 266 at the particle exit section 326. In other embodiments, the angle between the particle belt at the particle engagement section and the particle belt at the particle exit section may be one degree, two degrees, five degrees, ten degrees, twenty degrees, thirty degrees, fifty degrees, sixty degrees, seventy-five degrees, between zero degrees and five degrees, between zero degrees and ten degrees, between five degrees and twenty degrees, between ten degrees and forty-five degrees, between thirty degrees and sixty degrees, between zero and ninety degrees, etc. The particle belt 266 at the particle engagement section 324 disposed at the angle 344 may facilitate transfer of the particles 80 from the particle disc 262 to the particle belt 266. For example, the particle belt 266 at the particle engagement section 324 disposed at the angle 344 may facilitate receipt of the particles 80 at the particle engagement section 324.

As described above, the particle disc 262 is configured to meter the particles 80 and to provide a spacing between the particles 80 within the trench 31. The spacing between the particles 80 when disposed within the trench 31 may enhance plant development and/or yield. Additionally, the particle delivery system 260 is configured to accelerate the particles 80 generally toward and along the trench 31. The acceleration of the particles 80 by the particle delivery system 260 may enable the row unit to reduce a relative ground speed of the particles 80 compared to traditional row units that utilize seed tubes, which rely solely on gravity to accelerate the particles 80 for delivery to soil. For example, the particle delivery system 260 is configured to accelerate the particles 80 via the air flow system 290, gravity, and the particle belt 266.

The air flow system 290 is configured to accelerate the particles 80 via the first air flow 300, such that a particle transfer speed of the particles 80 expelled from the particle disc 262 toward the particle engagement section 324 of the particle belt 266 reaches a target particle transfer speed at the particle engagement section 324. The particle transfer speed of the particles 80 may reach the target particle transfer speed when the particle transfer speed is equal to the target particle transfer speed, when the particle transfer speed passes (e.g., becomes greater than or less than) the target particle transfer speed, or when the particle transfer speed is within a threshold range of the target particle transfer speed.

The particle belt 266 is configured to accelerate the particles 80 received from the particle disc 262, such that a particle exit speed of the particles 80 expelled from the particle belt 266 along the release trajectory 280 toward the trench 31 reaches a target particle exit speed. The particle exit speed of the particles 80 may reach the target particle exit speed when the particle exit speed is equal to the target particle exit speed, when the particle exit speed passes the target particle exit speed, or when the particle exit speed is within a threshold range of the target particle exit speed (e.g., the difference between the particle exit speed and the target particle exit speed is less than a threshold value).

The particle delivery system 260 includes the controller 170 configured to control the rotation rate (e.g., the rotational speed) of the particle disc 262 to adjust/control the spacing between the particles 80. For example, the controller 170 may control the motor 172, which is configured to drive rotation of the particle disc 262, to adjust/control the rotation rate of the particle disc 262 (e.g., by outputting an output signal to the motor 172 indicative of instructions to adjust the rotation rate of the particle disc 262). The controller 170 may control the motor 172 to achieve a target spacing between the particles 80. The controller 170 may determine the target spacing between the particles 80 based on a type of the particles 80, an input received from a user interface, or a combination thereof. In certain embodiments, the controller 170 may control the rotation rate of the particle disc 262 (e.g., via control of the motor 172) to achieve the target spacing based on a reference table identifying rotational speeds of the particle disc 262 that achieve particular spacings, based on an empirical formula, in response to sensor feedback, or a combination thereof.

In certain embodiments, the controller 170 is configured to control the first air flow 300 provided by the air flow system 290 to adjust/control a particle transfer speed of each particle 80 expelled from the particle disc 262 (e.g., from the release point 274 of the particle disc 82 toward the particle engagement section 324 of the particle belt 266), such that the particle transfer speed reaches a target particle transfer speed at the particle engagement section 324. For example, the controller 170 may control the air flow device 102, which is configured to provide the first air flow 300 to accelerate each particle 80 along the transfer trajectory 276. The controller 170 may determine the target particle transfer speed of the particles 80 based on the belt speed of the particle belt 266 and/or the type of the particles 80. The target particle transfer speed may be any suitable speed, such one-tenth kph, one-half kph, one kph, two kph, three kph, five kph, ten kph, fifteen kph, twenty kph, etc. In certain embodiments, the controller 170 may determine the target particle transfer speed as a target percentage of the belt speed of the particle belt 266 (e.g., thirty percent, fifty percent, seventy percent, eighty percent, ninety percent, ninety-five percent, etc.).

To control the first air flow 300 provided by the air flow system 290, the controller 170 may receive an input signal indicative of the particle transfer speed of the particle 80 at the particle engagement section 324 of the particle belt 266. For example, the controller 170 may receive the input signal from the particle sensor 178 of the particle delivery system 260. The particle sensor 178 may be positioned a fixed distance from the particle engagement section 324, such that the controller 170 may determine the particle transfer speed of the particle 80 at the particle engagement section 324 based on the fixed distance and the input signal indicative of the particle transfer speed received from the particle sensor 178 (e.g., based on gravitational acceleration of the particle 80 traveling the fixed distance from the particle sensor 178 to the particle engagement section 324 and/or based on acceleration due to the first air flow 300). In certain embodiments, the controller 170 may control valves configured to enable/restrict the first air flow 300 and/or the second air flow 328 (e.g., in addition or as an alternative to controlling the flow rates of the first air flow 300 and/or the second air flow 328).

The controller 170 may compare the particle transfer speed of the particle 80 at the particle engagement section 324 to the target particle transfer speed to determine whether a difference between the particle transfer speed and the target particle transfer speed exceeds a threshold value. In response to determining that the particle transfer speed at the particle engagement section 324 is less than the target particle transfer speed and the difference between the particle transfer speed and the target particle transfer speed exceeds the threshold value, the controller 170 may output an output signal indicative of instructions to increase the flow rate of the first air flow 300 from the second air tube 294. For example, the controller 170 may output the output signal to the air flow device 102 to cause the air flow device 102 to increase the flow rate of the first air flow 300. The increase in the air flow rate may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle engagement section 324 is greater than the target particle transfer speed and the difference between the particle transfer speed and the target particle transfer speed exceeds the threshold value, the controller 170 may output an output signal indicative of instructions to decrease the flow rate of the first air flow 300 provided by the air flow system 290. For example, the controller 170 may output the output signal to the air flow device 102 to cause the air flow device 102 to decrease the flow rate of the first air flow 300. The decrease in the air flow rate may decrease the particle transfer speed, such that the particle transfer speed reaches the target particle transfer speed (e.g., such that the difference between the particle transfer speed and the target particle transfer speed is less than the threshold value).

Additionally, the controller 170 is configured to control the belt speed of the particle belt 266 to adjust/control the particle exit speed of the particles 80 expelled from the particle belt 266, such that the particle exit speed reaches a target particle exit speed at the particle exit section 326. For example, the controller 170 may control a wheel 350, via the motor 176 which is configured to drive rotation of the particle belt 266, to adjust/control the belt speed of the particle belt 266 (e.g., by outputting an output signal to the motor 176 indicative of instructions to adjust the belt speed of the particle belt 266), thereby enabling the controller 170 to adjust/control the particle exit speed of the particles 80. The controller 170 may control the particle exit speed of the particles 80, such that the particle exit speed reaches the target particle exit speed. The controller 170 may determine the target particle exit speed of the particles 80 based on the type of the particles 80, an input received from a user interface, the ground speed of the row unit, or a combination thereof. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, seventy percent, eighty percent, ninety percent, ninety-five percent, one hundred percent, etc.).

To control the belt speed of the particle belt 266, the controller 170 may receive an input signal indicative of the particle exit speed of the particle 80 at the particle exit section 326 of the particle belt 266. For example, the controller 170 may receive the input signal from the particle sensor 186 of the particle delivery system 260 disposed proximate to the particle exit section 326 and along the release trajectory 280. The particle sensor 186 may be positioned a fixed distance from the particle exit section 326, such that the controller 170 may determine the particle exit speed of the particle 80 at the particle exit section 326 based on the fixed distance and the input signal indicative of the particle exit speed received from the particle sensor 186 (e.g., based on acceleration and/or deceleration of the particle 80 traveling the fixed distance).

The controller 170 may compare the particle exit speed of the particle 80 at the particle exit section 326 to the target particle exit speed to determine whether a difference between the particle exit speed and the target particle exit speed exceeds a threshold value. In response to determining that the particle exit speed at the particle exit section 326 is less than the target particle exit speed and the difference between the particle exit speed and the target particle exit speed exceeds the threshold value, the controller 170 may output an output signal indicative of instructions to increase the belt speed of the particle belt 266. For example, the controller 170 may output the output signal to the motor 176 to cause the motor 176 to increase the belt speed of the particle belt 266. The increase in the belt speed of the particle belt 266 may increase the particle exit speed, such that the particle exit speed reaches the target particle exit speed (e.g., such that the difference between the particle exit speed and the target particle exit speed is less than the threshold value).

In response to determining that the particle exit speed at the particle exit section 326 of the particle belt 266 is greater than the target particle exit speed and the difference between the particle exit speed and the target particle exit speed exceeds the threshold value, the controller 170 may output an output signal indicative of instructions to decrease the belt speed of the particle belt 266. For example, the controller 170 may output the output signal to the motor 176 to cause the motor 176 to decrease the belt speed of the particle belt 266. The decrease in the belt speed of the particle belt 266 may decrease the particle exit speed, such that the particle exit speed reaches the target particle exit speed (e.g., such that the difference between the particle exit speed and the target particle exit speed is less than the threshold value).

Additionally or alternatively, the controller 170 is configured to control the second air flow 328 provided by the air flow system 290 to adjust/control the particle exit speed of the particles 80 expelled from the particle belt 266, such that the particle exit speed reaches the target particle exit speed. For example, the controller 170 may control the air flow device 102, which is configured to provide the second air flow 328 to accelerate each particle 80 along the release trajectory 280.

To control the second air flow 328 provided by the air flow system 290, the controller 170 may receive the input signal indicative of the particle exit speed of the particle 80 at the particle exit section 326 of the particle belt 266 from the particle sensor 186. The controller 170 may compare the particle exit speed of the particle 80 at the particle exit section 326 to the target particle exit speed to determine whether a difference between the particle exit speed and the target particle exit speed exceeds the threshold value. In response to determining that the particle exit speed at the particle exit section 326 is less than the target particle exit speed and the difference between the particle exit speed and the target particle exit speed exceeds the threshold value, the controller 170 may output an output signal indicative of instructions to increase the flow rate of the second air flow 328. For example, the controller 170 may output the output signal to the air flow device 102 to cause the air flow device 102 to increase the flow rate of the second air flow 328. The increase in the air flow rate may increase the particle exit speed, such that the particle exit speed reaches the target particle exit speed (e.g., such that the difference between the particle exit speed and the target particle exit speed is less than the threshold value).

In response to determining that the particle exit speed at the particle exit section 326 of the particle belt 266 is greater than the target particle exit speed and the difference between the particle exit speed and the target particle exit speed exceeds the threshold value, the controller 170 may output an output signal indicative of instructions to decrease the flow rate of the second air flow 328. For example, the controller 170 may output the output signal to the air flow device 102 to cause the air flow device 102 to decrease the flow rate of the second air flow 328. The decrease in the air flow rate may decrease the particle exit speed, such that the particle exit speed reaches the target particle exit speed (e.g., such that the difference between the particle exit speed and the target particle exit speed is less than the threshold value).

In some embodiments, the controller 170 may determine the target particle exit speed based on a ground speed of the row unit having the particle delivery system 260. For example, the controller 170 may set the target particle exit speed to be equal to ground speed of the row unit. As such, the controller 170 may control the belt speed of the particle belt 266, via control of the wheel 350/motor 176, to adjust/control the belt speed of the particle belt 266, thereby enabling the controller 170 to adjust/control the particle exit speed of the particles 80 to generally match the ground speed of the row unit (e.g., to be within the threshold range of the target particle exit speed that generally matches the ground speed of the row unit). As illustrated, the particle belt 266 at the particle exit section 326 moves in the direction indicated by arrow 278, which is generally opposite a direction of travel of the particle delivery system 260 (e.g., of the row unit having the particle delivery system 260), as indicated by arrow 346, and generally parallel to the trench 31, thereby facilitating deposition of the particles 80 into the trench. For example, as the belt speed of the particle belt 266 at the particle exit section 326 is controlled to generally match a ground speed of the row unit, the particle exit speed of the particles 80 (e.g., a horizontal component of the particle exit speed) relative to the trench 31 may be zero or may be negligible. The particle exit speed of the particles 80 relative to the trench 31 being zero/negligible may reduce/prevent rolling of the particles 80 within the trench 31, thereby facilitating accurate deposition of the particles 80 within the trench 31 at particular spacings.

Figure 8:
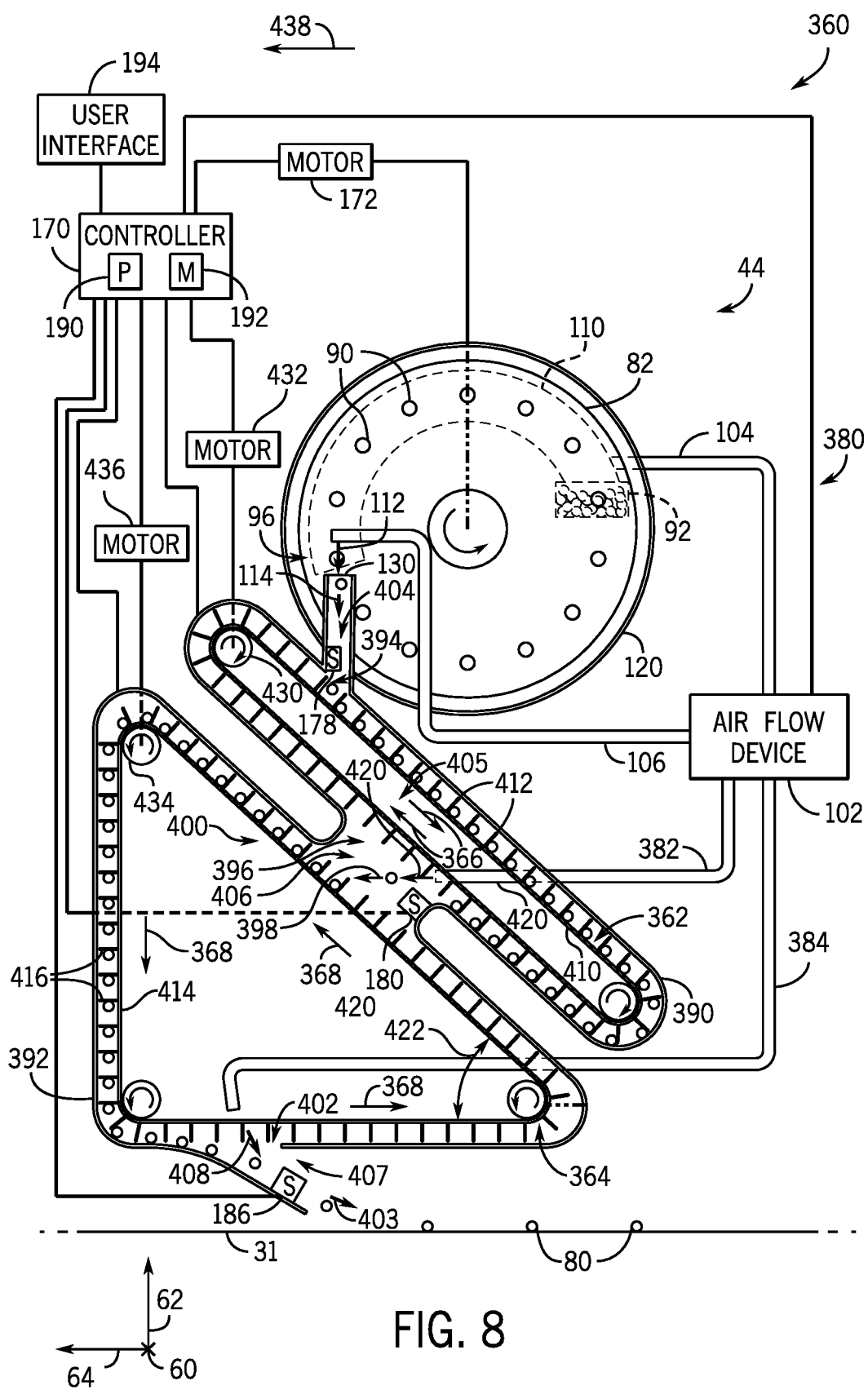
FIG. 8 is a side view of another embodiment of a particle delivery system that may be employed within the row unit of FIG. 2, in accordance with an aspect of the present disclosure.

FIG. 8 is a side view of another embodiment of a particle delivery system 360 that may be employed within the row unit of FIG. 2. As illustrated, the particle delivery system 360 includes the particle metering and singulation unit 44, which includes the particle disc 82 and is configured to meter and establish the spacing between the particles 80. The particle delivery system 360 also includes a first particle belt 362 (e.g., an endless member) configured to accelerate and move the particles 80 to a second particle belt 364 (e.g., an endless member). Additionally, the particle delivery system 360 includes the second particle belt 364 configured to accelerate and move the particles 80 toward the trench 31. The first particle belt 362 is configured to rotate, as indicated by arrows 366, to move the particles 80 to the second particle belt 364. The second particle belt 86 is configured to rotate, as indicated by arrows 368, to expel the particles 80 into the trench 31.

As illustrated, the particle delivery system 360 includes an air flow system 380 having the air flow device 102, the first air tube 104 fluidly coupled to the air flow device 102, the second air tube 106 fluidly coupled to the air flow device 102, a third air tube 382 fluidly coupled to the air flow device 102, and a fourth air tube 384 fluidly coupled to the air flow device 102. The air flow system 380 is configured to reduce the air pressure within the vacuum passage 110 positioned along a portion of the particle disc 82, thereby drawing the particles 80 from the particle hopper 92 toward and against the apertures 90. As described above, the first air tube 104 is fluidly coupled to the air flow device 102 and to the vacuum passage 110, and the air flow device 102 is configured to draw air through the apertures 90 aligned with the vacuum passage 110, via the first air tube 104. At the release point 96, the air flow system 380 provides, via the second air tube 106, the first air flow 112 configured to remove each particle 80 from the respective aperture 90 (e.g., by overcoming the vacuum formed at the respective aperture 90). The particles 80 are released from the particle disc 82, and rotation of the particle disc 82 imparts a velocity on the particles along the release trajectory 114. The particles 80 accelerate along the release trajectory 114 under the influence of gravity. In certain embodiments, the first air flow 112 may be omitted, such that the particles 80 are released from respective apertures 90 as the vacuum at each aperture 90 terminates (e.g., at an end of the vacuum passage 110).

The particle delivery system 360 includes the disc housing 120, a first belt housing 390, and a second belt housing 392. The particle disc 82 is disposed within and configured to rotate within the disc housing 120. The first particle belt 362 is disposed within and configured to rotate within the first belt housing 390. The second particle belt 364 is disposed within and configured to rotate within the second belt housing 392. The first belt housing 390 is coupled to the second belt housing 392.

Additionally, the particle delivery system 360 includes the particle tube 130 coupled to the disc housing 120 and to the first belt housing 390. The particle tube 130 extends generally from the release point 96 to a particle engagement section 394 (e.g., a first particle engagement section) of the first particle belt 362 and is configured to at least partially direct the particles 80 from the particle disc 82 (e.g., from the release point 96 of the particle disc 82) to the first particle belt 362 (e.g., to the particle engagement section 394 of the first particle belt 362) along the release trajectory 114. In certain embodiments, the particle tube may be omitted.

The first particle belt 362 includes the particle engagement section 394 and a particle exit section 396 (e.g., a first particle exit section) on generally opposite sides of the first particle belt 362. The first particle belt 362 is configured to receive the particles 80 from the particle metering and singulation unit 44 at the particle engagement section 394 and to expel the particles 80 toward the second particle belt 364 along a transfer trajectory 398 at the particle exit section 396. The second particle belt 364 includes a particle engagement section 400 (e.g., a second particle engagement section) and a particle exit section 402 (e.g., a second particle engagement section) on generally opposite sides of the second particle belt 364. The second particle belt 364 is configured to receive the particles 80 from the first particle belt 362 at the particle engagement section 400 and to expel the particles 80 to the trench 31 in soil along a release trajectory 403 at the particle exit section 402. The first particle belt 362 receives the particles 80 through a particle reception aperture 404 of the first belt housing 390 and expels the particles 80 toward the second particle belt 364 through a particle exit aperture 405 of the first belt housing 390.

As illustrated, the first particle belt 362 and the second particle belt 364 are configured to rotate in generally opposite directions, as indicated by arrows 366 and 368, respectively. As such, the first particle belt 362 at the particle exit section 396 and the second particle belt 364 at the particle engagement section move in a similar/same linear direction, which may facilitate transfer of the particles 80 from the first particle belt 362 to the second particle belt 364.

Additionally, the second belt housing 392 has a particle reception aperture 406 and a particle exit aperture 407. The second particle belt 364 is configured to receive the particles 80 at the particle engagement section 400 of the second particle belt 364. Accordingly, the particles 80 flow along the transfer trajectory 398, through the particle reception aperture 406, and to the particle engagement section 400. In certain embodiments, the air flow system 290 may provide the second air flow 420 through the particle reception aperture 406 to accelerate the particles 80 from the first particle belt 362 toward the second particle belt 364. Further, the second particle belt 364 is configured to expel the particles 80 at the particle exit section 402 of the second particle belt 364. Accordingly, the particles 80 flow from the particle exit section 402, along the release trajectory 403, through the particle exit aperture 407, and toward the trench 31 in soil. The air flow system 380 is also configured to provide a third air flow 408 from the fourth air tube 384 to accelerate the particles 80 along the release trajectory 403 (e.g., the air flow system 380 may apply a force to the particles 80 via the third air flow 408). In certain embodiments, the air flow system 380 may provide the third air flow 408 through the particle exit aperture 407 to accelerate the particles 80 away from the particle exit section 402 of the second particle belt 364 and toward the trench 31. In some embodiments, the air flow system or portion(s) of the air flow system may be omitted from the particle delivery system. For example, the particle delivery system may only include the air flow device, the third air tube, and the fourth air tube. Alternatively, the air flow system may be entirely omitted from the particle delivery system.

The first particle belt 362 includes a base 410 (e.g., a first base) and flights 412 (e.g., first flights) coupled to and extending from the base 410, and the second particle belt 364 includes a base 414 (e.g., a second base) and flights 416 (e.g., second flights) coupled to and extending from the base 414. Each pair of opposing flights 412 of the first particle belt 362 is configured to receive a respective particle 80 at the particle engagement section 394 of the first particle belt 362 and to move the respective particle 80 to the particle exit section 396 of the first particle belt 362. Additionally, each pair of opposing flights 416 of the second particle belt 364 is configured to receive a respective particle 80 at the particle engagement section 400 of the second particle belt 364 and to move the respective particle 80 to the particle exit section 402 of the second particle belt 364. The air flow system 380 is configured to provide a second air flow 420 from the third air tube 382 to accelerate the particles 80 along the transfer trajectory 398 (e.g., the air flow system 380 may apply a force to the particles 80 via the second air flow 420).

The second particle belt 364 extends generally parallel to the trench 31 at the particle exit section 402, which may facilitate deposition of the particles 80 into the trench 31. For example, as described in greater detail below, a belt speed of the second particle belt 364 may be controlled to generally match a ground speed of the row unit having the particle delivery system 360, which may enable the particles 80 to be deposited into the trench 31 at a speed (e.g., a speed relative to the trench 31) that is zero or that is negligible. The zero/negligible speed of the particles 80 relative to the trench 31 may enable consistent placement of the particles 80 within the trench and/or a softer impact between the particles 80 and soil within the trench 31. As described herein, the zero/negligible speed of the particles 80 relative to the trench 31 refers to a horizontal component of a velocity of the particles 80 generally matching the ground speed of the row unit, such that a difference between the horizontal component of the velocity and the ground speed is zero/negligible. For example, as the particles 80 move downwardly toward the trench 31 (e.g., after exiting the particle belt and the particle delivery system generally), the horizontal component of the velocity may generally match the ground speed of the row unit.

In certain embodiments, the second particle belt at the particle exit section may extend at an angle relative to the trench and about the longitudinal axis (e.g., one degree, two degrees, five degrees, ten degrees, twenty degrees, forty-five degrees, between zero degrees and five degrees, between zero degrees and ten degrees, between five degrees and twenty degrees, between ten degrees and forty-five degrees, etc.). Additionally, the second particle belt 364 at the particle engagement section 400 extends at an angle 422 of forty-five degrees (e.g., about the longitudinal axis 60) relative to the second particle belt 364 at the particle exit section 402. In other embodiments, the angle between the second particle belt at the particle engagement section and the second particle belt at the particle exit section may be one degree, two degrees, five degrees, ten degrees, twenty degrees, thirty degrees, fifty degrees, sixty degrees, seventy-five degrees, between zero degrees and five degrees, between zero degrees and ten degrees, between five degrees and twenty degrees, between ten degrees and forty-five degrees, between thirty degrees and sixty degrees, between zero and ninety degrees, etc. The second particle belt 364 at the particle engagement section 400 being disposed at the angle 422 may facilitate transfer of the particles 80 from the first particle belt 362 to the second particle belt 364. For example, the second particle belt 364 at the particle engagement section 400 being disposed at the angle 422 may facilitate receipt of the particles 80 at the particle engagement section 400. In certain embodiments, the first particle belt 362 may extend generally parallel to the second particle belt 364 at the particle engagement section 400 of the second particle belt 364, such that the first particle belt 362 is disposed at the angle 422 relative to the second particle belt 364 at the particle exit section 402 of the second particle belt 364.

As described above, the particle disc 82 is configured to meter the particles 80 and to provide a spacing between the particles 80 within the trench 31. The spacing between the particles 80 when disposed within the trench 31 may enhance plant development and/or yield. Additionally, the particle delivery system 360 is configured to accelerate the particles 80 generally toward and along the trench 31. The acceleration of the particles 80 by the particle delivery system 360 may enable the row unit to reduce a relative ground speed of the particles 80 compared to traditional row units that utilize seed tubes, which rely solely on gravity to accelerate the particles 80 for delivery to soil. For example, the particle delivery system 360 is configured to accelerate the particles 80 via the air flow system 380, gravity, the first particle belt 362, the second particle belt 364, or a combination thereof (e.g., in certain embodiments, portions of the air flow system 380 may be omitted from the particle delivery system 360). The air flow system 380 is configured to provide the first air flow 112 from the second air tube 106 to accelerate the particles 80 along the release trajectory 114 (e.g., the air flow system 380 may apply a force to the particles 80 via the first air flow 112). Additionally, the particle delivery system 360 is configured to enable the particles 80 to accelerate under the influence of gravity as the particles 80 travel between the particle disc 82 and the first particle belt 362.

The first particle belt 362 is configured to accelerate the particles 80 received from the particle disc 82, such that a particle transfer speed of the particles 80 expelled from the first particle belt 362 along the transfer trajectory 398 toward the particle engagement section 400 of the second particle belt 364 reaches a target particle transfer speed at the particle engagement section 400. Additionally or alternatively, the second air flow 420 provided by the air flow system 380 may accelerate the particles 80, such that the particle transfer speed reaches the target particle transfer speed. The particle transfer speed of the particles 80 may reach the target particle transfer speed when the particle transfer speed is equal to the target particle transfer speed, when the particle transfer speed passes the target particle transfer speed, or when the particle transfer speed is within a threshold range of the target particle transfer speed (e.g., the difference between the particle transfer speed and the target particle transfer speed is less than a threshold value).

The second particle belt 364 is configured to accelerate the particles 80 received from the first particle belt 362, such that a particle exit speed of the particles 80 expelled from the second particle belt 364 along the release trajectory 403 toward the trench 31 reaches a target particle exit speed. The particle exit speed of the particles 80 may reach the target particle exit speed when the particle exit speed is equal to the target particle exit speed, when the particle exit speed passes the target particle exit speed, or when the particle exit speed is within a threshold value of the target particle exit speed (e.g., the difference between the particle exit speed and the target particle exit speed is less than a threshold value). In certain embodiments, the second particle belt 364 is configured to rotate faster than the first particle belt 362 to accelerate the particles 80. For example, the first particle belt 362 may rotate at a first belt speed, and the second particle belt 364 may rotate at a second belt speed faster than the first belt speed (e.g., the target particle exit speed may be greater than the target particle transfer speed). In other embodiments, the first belt speed of the first particle belt 362 may be generally equal to the second belt speed of the second particle belt 364, such that the target particle exit speed and the target particle transfer speed are generally equal.

In some embodiments, the particle delivery system may include additional particle belts (e.g., in addition to the first particle belt 362 and the second particle belt 364) configured to accelerate the particles toward and/or along the trench. Each particle belt (from the particle belt adjacent to the hopper to the particle belt adjacent to the trench) may rotate progressively faster, such that each progressive particle belt imparts a greater velocity on each particle as the particle is released from the respective particle belt. Alternatively, some or all of the particle belts may rotate at generally similar belt speeds.

The particle delivery system 360 includes the controller 170 configured to control the rotation rate (e.g., the rotational speed) of the particle disc 82 to adjust/control the spacing between the particles 80. For example, as described above, the controller 170 may control the motor 172, which is configured to drive rotation of the particle disc 82, to adjust/control the rotation rate of the particle disc 82 (e.g., by outputting an output signal to the motor 172 indicative of instructions to adjust the rotation rate of the particle disc 82). Additionally, in embodiments having the first air flow 112 provided by the air flow system 380, the controller 170 may be configured to control the first air flow 112 to adjust/control a particle transfer speed of each particle 80 expelled from the particle disc 82 (e.g., from the release point 96 of the particle disc 82, along the release trajectory 114, and toward the particle engagement section 394 of the first particle belt 362), such that the particle transfer speed reaches the target particle transfer speed at the particle engagement section 394.

Additionally, the controller 170 is configured to control the belt speed of the first particle belt 362 to adjust/control the particle transfer speed of the particles 80 expelled from the particle exit section 396 of the first particle belt 362, such that the particle transfer speed reaches a target particle transfer speed. For example, the controller 170 may control a wheel 430, via a motor 432, which is configured to drive rotation of the first particle belt 362, to adjust/control the belt speed of the first particle belt 362 (e.g., by outputting an output signal to the motor 432 indicative of instructions to adjust the belt speed of the first particle belt 362), thereby enabling the controller 170 to adjust/control the particle transfer speed of the particles 80. The controller 170 may control the particle transfer speed of the particles 80, such that the particle transfer speed reaches the target particle transfer speed. The controller 170 may determine the target particle transfer speed of the particles 80 based on the type of the particles 80, a size of the particles 80 (e.g., a nominal size and/or an average size of each particle), an input received from a user interface, the ground speed of the row unit, or a combination thereof. The target particle transfer speed may be any suitable speed, such one kilometer per hour (kph), two kph, three kph, five kph, ten kph, fifteen kph, twenty kph, etc. In certain embodiments, the controller 170 may determine the target particle transfer speed as a target percentage of a belt speed of the second particle belt 364 (e.g., a second belt speed) and/or the ground speed of the row unit (e.g., thirty percent, fifty percent, seventy percent, eighty percent, ninety percent, ninety-five percent, etc.).

To control the belt speed of the first particle belt 362, the controller 170 may receive an input signal indicative of the particle transfer speed of the particle 80 at the particle engagement section 400 of the second particle belt 364. For example, the controller 170 may receive the input signal from the particle sensor 180 of the particle delivery system 360 disposed proximate to the particle engagement section 400 and along the transfer trajectory 398. The particle sensor 180 may be positioned a fixed distance from the particle engagement section 400, such that the controller 170 may determine the particle transfer speed of the particle 80 at the particle engagement section 400 based on the fixed distance and the input signal indicative of the particle transfer speed received from the particle sensor 180 (e.g., based on acceleration and/or deceleration of the particle 80 traveling the fixed distance).

The controller 170 may compare the particle transfer speed of the particle 80 at the particle engagement section 400 to the target particle transfer speed to determine whether a difference between the particle transfer speed and the target particle transfer speed exceeds a threshold value. In response to determining that the particle transfer speed at the particle engagement section 400 is less than the target particle transfer speed and the difference between the particle transfer speed and the target particle transfer speed exceeds the threshold value, the controller 170 may output an output signal indicative of instructions to increase the belt speed of the first particle belt 362. For example, the controller 170 may output the output signal to the motor 432 to cause the motor 432 to increase the belt speed of the first particle belt 362. The increase in the belt speed of the first particle belt 362 may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle engagement section 400 is greater than the target particle transfer speed and the difference between the particle transfer speed and the target particle transfer speed exceeds the threshold value, the controller 170 may output an output signal indicative of instructions to decrease the belt speed of the first particle belt 362. For example, the controller 170 may output the output signal to the motor 432 to cause the motor 432 to decrease the belt speed of the first particle belt 362. The decrease in the belt speed of the first particle belt 362 may decrease the particle transfer speed, such that the particle transfer speed reaches the target particle transfer speed (e.g., such that the difference between the particle transfer speed and the target particle transfer speed is less than the threshold value).

Additionally, the controller 170 is configured to control the second air flow 420 provided by the air flow system 380 to adjust/control the particle transfer speed of the particles 80 expelled from the particle exit section 396 of the first particle belt 362, such that the particle transfer speed reaches the target particle transfer speed. For example, the controller 170 may control the second air flow 420 by outputting an output signal to the air flow device 102 indicative of instructions to adjust a flow rate of the second air flow 420, thereby enabling the controller 170 to adjust/control the particle transfer speed of the particles 80.

To control the second air flow 420, the controller 170 may compare the particle transfer speed of the particle 80 at the particle exit section 396 to the target particle transfer speed to determine whether a difference between the particle transfer speed and the target particle transfer speed exceeds a threshold value. In response to determining that the particle transfer speed at the particle exit section 396 is less than the target particle transfer speed and the difference between the particle transfer speed and the target particle transfer speed exceeds the threshold value, the controller 170 may output an output signal indicative of instructions to increase the flow rate of the second air flow 420. For example, the controller 170 may output the output signal to the air flow device 102 to cause the air flow device 102 to increase the flow rate of the second air flow 420. The increase in the flow rate of the second air flow 420 may increase the particle transfer speed, such that the particle transfer speed reaches the target particle transfer speed.

In response to determining that the particle transfer speed at the particle exit section 396 of the first particle belt 362 is greater than the target particle transfer speed and the difference between the particle transfer speed and the target particle transfer speed exceeds the threshold value, the controller 170 may output an output signal indicative of instructions to decrease the flow rate of the second air flow 420. For example, the controller 170 may output the output signal to the air flow device 102 to cause the air flow device 102 to decrease the flow rate of the second air flow 420. The decrease in the flow rate of the second air flow 420 may decrease the particle transfer speed, such that the particle transfer speed reaches the target particle transfer speed. In certain embodiments, the controller 170 may control valve(s) configured to enable/restrict the second air flow 420 (e.g., in addition or as an alternative to controlling the flow rate of the second air flow 420).

Furthermore, the controller 170 is configured to control the belt speed of the second particle belt 364 to adjust/control the particle exit speed of the particles 80 expelled from the second particle belt 364 (e.g., from the particle exit section 402 of the second particle belt 364, along the release trajectory 403, and toward and/or along the trench 31), such that the particle exit speed reaches a target particle exit speed. For example, the controller 170 may control a wheel 434, via a motor 436, which is configured to drive rotation of the second particle belt 364, to adjust/control the belt speed of the second particle belt 364 (e.g., by outputting an output signal to the motor 436 indicative of instructions to adjust the belt speed of the second particle belt 364), thereby enabling the controller 170 to adjust/control the particle exit speed of the particles 80. The controller 170 may control the particle exit speed of the particles 80, such that the particle exit speed reaches the target particle exit speed. The controller 170 may determine the target particle exit speed of the particles 80 based on the type of the particles 80, an input received from a user interface, the ground speed of the row unit, or a combination thereof. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, seventy percent, eighty percent, ninety percent, ninety-five percent, one hundred percent, etc.).

To control the belt speed of the second particle belt 364, the controller 170 may receive an input signal indicative of the particle exit speed of the particle 80 at the particle exit section 402 of the second particle belt 364. For example, the controller 170 may receive the input signal from the particle sensor 186 of the particle delivery system 360 disposed proximate to the particle exit section 140 and along the release trajectory 142. The particle sensor 186 may be positioned a fixed distance from the particle exit section 402, such that the controller 170 may determine the particle exit speed of the particle 80 at the particle exit section 402 based on the fixed distance and the input signal indicative of the particle exit speed received from the particle sensor 186 (e.g., based on acceleration and/or deceleration of the particle 80 traveling the fixed distance).

The controller 170 may compare the particle exit speed of the particle 80 at the particle exit section 402 to the target particle exit speed to determine whether a difference between the particle exit speed and the target particle exit speed exceeds a threshold value. In response to determining that the particle exit speed at the particle exit section 402 is less than the target particle exit speed and the difference between the particle exit speed and the target particle exit speed exceeds the threshold value, the controller 170 may output an output signal indicative of instructions to increase the belt speed of the second particle belt 364. For example, the controller 170 may output the output signal to the motor 436 to cause the motor 436 to increase the belt speed of the second particle belt 364. The increase in the belt speed of the second particle belt 364 may increase the particle exit speed, such that the particle exit speed reaches the target particle exit speed (e.g., such that the difference between the particle exit speed and the target particle exit speed is less than the threshold value).

In response to determining that the particle exit speed at the particle exit section 402 of the second particle belt 364 is greater than the target particle exit speed and the difference between the particle exit speed and the target particle exit speed exceeds the threshold value, the controller 170 may output an output signal indicative of instructions to decrease the belt speed of the second particle belt 364. For example, the controller 170 may output the output signal to the motor 436 to cause the motor 436 to decrease the belt speed of the second particle belt 364. The decrease in the belt speed of the second particle belt 364 may decrease the particle exit speed, such that the particle exit speed reaches the target particle exit speed (e.g., such that the difference between the particle exit speed and the target particle exit speed is less than the threshold value).

Additionally or alternatively, the controller 170 is configured to control the third air flow 408 provided by the air flow system 380 to adjust/control the particle exit speed of the particles 80 expelled from the second particle belt 364, such that the particle exit speed reaches the target particle exit speed. For example, the controller 170 may control the air flow device 102, which is configured to provide the third air flow 408 to accelerate each particle 80 along the release trajectory 403.

To control the third air flow 408 provided by the air flow system 380, the controller 170 may receive the input signal indicative of the particle exit speed of the particle 80 at the particle exit section 402 of the second particle belt 364 from the particle sensor 186. The controller 170 may compare the particle exit speed of the particle 80 at the particle exit section 402 to the target particle exit speed to determine whether a difference between the particle exit speed and the target particle exit speed exceeds the threshold value. In response to determining that the particle exit speed at the particle exit section 402 is less than the target particle exit speed and the difference between the particle exit speed and the target particle exit speed exceeds the threshold value, the controller 170 may output an output signal indicative of instructions to increase the flow rate of the third air flow 408. For example, the controller 170 may output the output signal to the air flow device 102 to cause the air flow device 102 to increase the flow rate of the third air flow 408. The increase in the air flow rate may increase the particle exit speed, such that the particle exit speed reaches the target particle exit speed (e.g., such that the difference between the particle exit speed and the target particle exit speed is less than the threshold value).

In response to determining that the particle exit speed at the particle exit section 402 of the second particle belt 364 is greater than the target particle exit speed and the difference between the particle exit speed and the target particle exit speed exceeds the threshold value, the controller 170 may output an output signal indicative of instructions to decrease the flow rate of the third air flow 408. For example, the controller 170 may output the output signal to the air flow device 102 to cause the air flow device 102 to decrease the flow rate of the third air flow 408. The decrease in the air flow rate may decrease the particle exit speed, such that the particle exit speed reaches the target particle exit speed (e.g., such that the difference between the particle exit speed and the target particle exit speed is less than the threshold value).

In some embodiments, the controller 170 may determine the target particle exit speed based on a ground speed of the row unit having the particle delivery system 360. For example, the controller 170 may set the target particle exit speed to be equal to ground speed of the row unit. As such, the controller 170 may control the belt speed of the second particle belt 364, via control of the wheel 434/motor 436, to adjust/control the belt speed of the second particle belt 364, thereby enabling the controller 170 to adjust/control the particle exit speed of the particles 80 to generally match the ground speed of the row unit (e.g., to be within the threshold range of the target particle exit speed that generally matches the ground speed of the row unit). As illustrated, the second particle belt 364 at the particle exit section 402 moves in the direction indicated by arrow 368, which is generally opposite a direction of travel of the particle delivery system 360 (e.g., of the row unit having the particle delivery system 360), as indicated by arrow 438, and generally parallel to the trench 31, thereby facilitating deposition of the particles 80 into the trench. For example, as the belt speed of the second particle belt 364 at the particle exit section 402 is controlled to generally match a ground speed of the row unit, the particle exit speed of the particles 80 (e.g., a horizontal component of the particle exit speed) relative to the trench 31 may be zero or may be negligible. The particle exit speed of the particles 80 relative to the trench 31 being zero/negligible may reduce/prevent rolling of the particles 80 within the trench 31, thereby facilitating accurate deposition of the particles 80 within the trench 31 at particular spacings.

Figure 9:
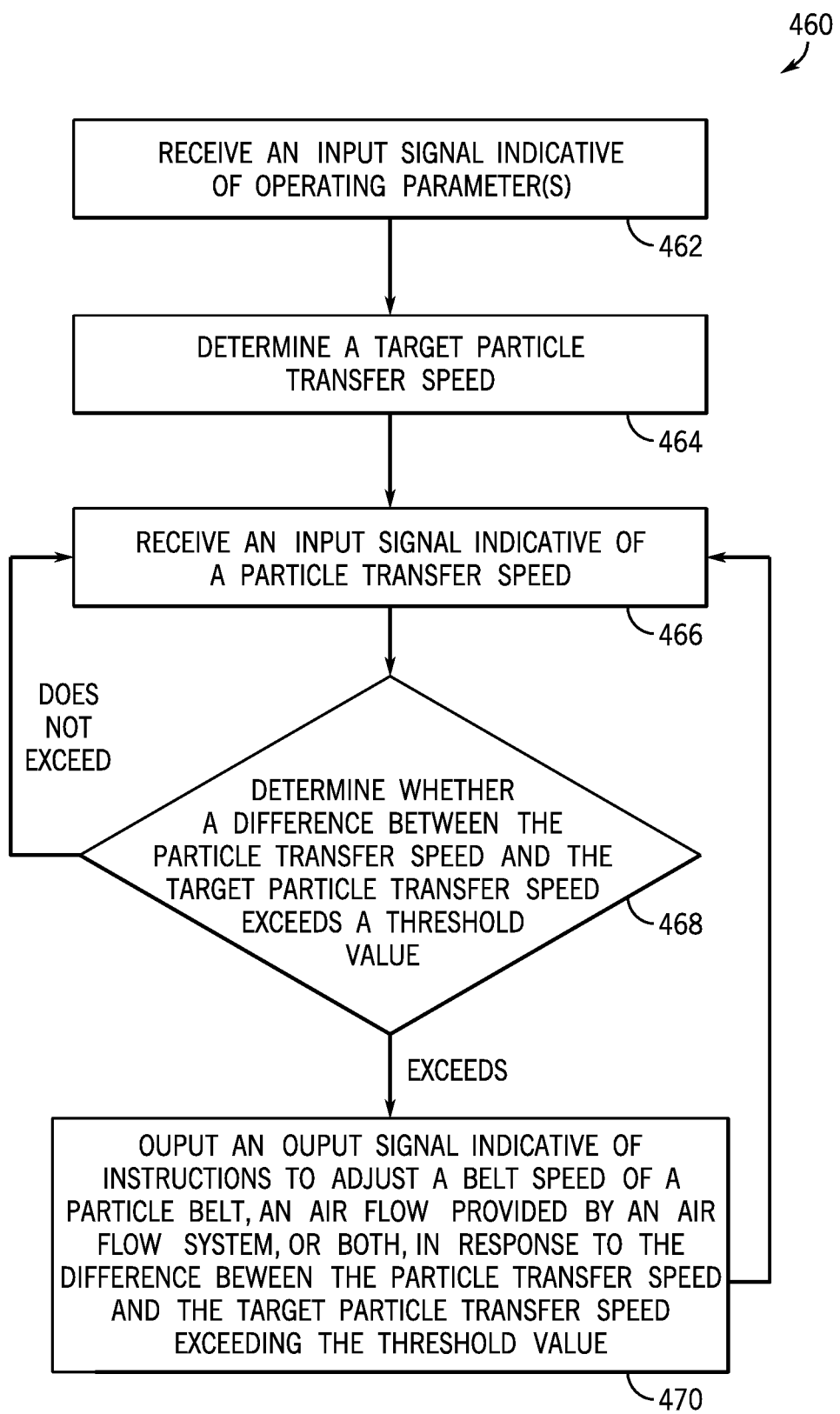
FIG. 9 is a flow diagram of an embodiment of a process for controlling a particle delivery system, in accordance with an aspect of the present disclosure.

FIG. 9 is a flow diagram of an embodiment of a process 460 for controlling a particle delivery system. The process 460, or portions thereof, may be performed by the controller of the particle delivery system. The process 460 begins at block 462, in which an input signal indicative of operating parameter(s) is received. For example, the operating parameters may include the type of the particles, the ground speed of the row unit, a spacing between flights of one or more particle belts, a size of the particles, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 464, the target particle transfer speed is determined. For example, the controller may determine the target particle transfer speed of the particles based on the type of the particles, the belt speed of the particle belt (e.g., the particle belt having the particle engagement section configured to receive the particles traveling at the particle transfer speed), the spacing between flights of the second particle belt, the size of the particles, and/or other operating parameters. At block 466, an input signal indicative of the particle transfer speed of the particle at the particle engagement section of the particle belt is received. For example, the controller may receive the input signal indicative of the particle transfer speed from the particle sensor disposed proximate to the particle engagement section. In certain embodiments, the controller may receive multiple input signals from the particle sensor, in which each input signal is indicative of a particle transfer speed of a respective particle. The controller may determine an average of the multiple particle transfer speeds to determine the average particle transfer speed of the particles at the particle engagement section. As such, the controller may account for variance among the particle transfer speeds of multiple particles at the particle engagement section to reduce excessive control actions (e.g., adjustments to the belt speed of the particle belt and/or the air flow provided by the air flow system).

At block 468, a determination of whether a difference between the particle transfer speed and the target particle transfer speed exceeds a threshold value is made (e.g., by the controller). Additionally, a determination of whether the particle transfer speed is less than or greater than the target particle transfer speed is made (e.g., by the controller). The threshold value may be determined based on the type of the particles and/or the belt speed of the particle belt. In response to the difference exceeding the threshold value, the process 460 proceeds to block 470. In response to the difference not exceeding the threshold, the process 460 returns to block 466 and receives the next input signal indicative of the particle transfer speed.

At block 470, in response to the difference between the particle transfer speed and the target particle transfer speed exceeding the threshold value, an output signal indicative of instructions to adjust the belt speed of the particle belt and/or the air flow (e.g., the first air flow and/or the second air flow) provided by the air flow system is output by the controller. For example, the controller may output the output signal indicative of instructions to increase the belt speed of the particle belt in response to a determination that the particle transfer speed is less than the target particle transfer speed and the difference between the particle transfer speed and the target particle transfer speed exceeds the threshold value, or the controller may output the output signal indicative of instructions to decrease the belt speed of the particle belt in response to a determination that the particle transfer speed is greater than the target particle transfer speed and the difference between the particle transfer speed and the target particle transfer speed exceeds the threshold value. In embodiments with the first air flow and/or the second air flow, the controller may output the output signal indicative of instructions to increase the flow rate of the air flow provided by the air flow system in response to the determination that the particle transfer speed is less than the target particle transfer speed and the difference between the particle transfer speed and the target particle transfer speed exceeds the threshold value, or the controller may output the output signal indicative of instructions to decrease the flow rate of the air flow provided by the air flow system in response to the determination that the particle transfer speed is greater than the target particle transfer speed and the difference between the particle transfer speed and the target particle transfer speed exceeds the threshold value.

In certain embodiments, the controller may determine whether the particle transfer speed is within a first threshold value of the target particle transfer speed and whether the particle transfer speed is within a second threshold value of the target particle transfer speed. For example, in response to the difference between the particle transfer speed and the target particle transfer speed exceeding a first threshold value, the controller may perform a first control action, such as adjusting the belt speed of the particle belt. In response to the difference between the particle transfer speed and the target particle transfer speed exceeding a second threshold value smaller than the first threshold value (e.g., the second threshold value being a smaller range of the target particle transfer speed, as compared to the first threshold value), the controller may perform a second control action (e.g., in addition to or in place of the first control action), such as adjusting the flow rate of the air flow provided by the air flow system.

After completing block 470, the process 460 returns to block 466 and receives the next input signal indicative of the particle transfer speed of the particle at the particle engagement section of the particle belt. The next determination is made of whether the difference between the particle transfer speed and the target particle transfer speed exceeds the threshold value (e.g., block 468), and the belt speed of the particle belt and/or the flow rate of the air flow may be adjusted in response to the determination. As such, blocks 466-470 of the process 460 may be iteratively performed (e.g., by the controller of the particle delivery system and/or by another suitable controller) to facilitate acceleration of the particles to the target particle transfer speed and transfer of the particles to the particle engagement section of the particle belt. In some embodiments, certain blocks of the blocks 462-470 may be omitted from the process 460, and/or the order of the blocks 462-470 may be different.

Figure 10:
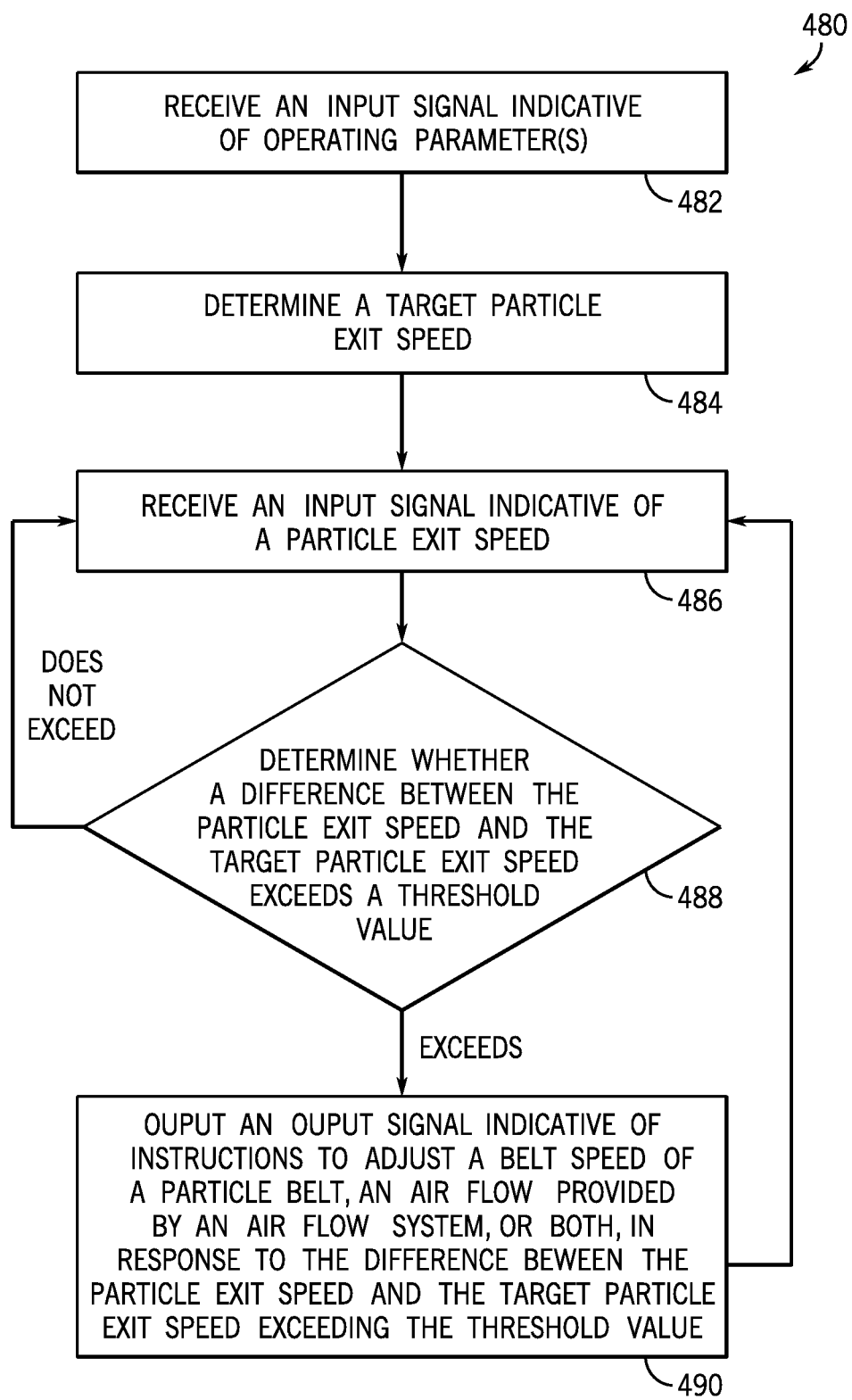
FIG. 10 is a flow diagram of an embodiment of a process for controlling a particle delivery system, in accordance with an aspect of the present disclosure.

FIG. 10 is a flow diagram of an embodiment of a process 480 for controlling a particle delivery system. The process 480, or portions thereof, may be performed by the controller of the particle delivery system. The process 480 begins at block 482, in which an input signal indicative of operating parameter(s) is received. For example, the operating parameters may include the type of the particles, the ground speed of the row unit, a spacing between flights of one or more particle belts, a size of the particles, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 484, the target particle exit speed is determined. For example, the controller may determine the target particle exit speed of the particles based on the type of the particles, the ground speed of the row unit, the size of the particles, and/or other operating parameters. At block 486, an input signal indicative of the particle exit speed of the particle at the particle exit section of the particle belt is received. For example, the controller may receive the input signal indicative of the particle exit speed from the particle sensor disposed proximate to the particle exit section of the particle belt. In certain embodiments, the controller may receive multiple input signals from the particle sensor, in which each input signal is indicative of a particle exit speed of a respective particle. The controller may determine an average of the multiple particle exit speeds to determine the average particle exit speed of the particles at the particle exit section. As such, the controller may account for variance among the particle exit speeds of multiple particles at the particle exit section to reduce excessive control actions (e.g., adjustments to the belt speed of the particle belt and/or the air flow provided by the air flow system).

At block 488, a determination of whether a difference between the particle exit speed and the target particle exit speed exceeds a threshold value is made (e.g., by the controller). Additionally, a determination of whether the particle exit speed is less than or greater than the target particle exit speed is made (e.g., by the controller). The threshold value may be determined based on the type of the particles, the ground speed of the row unit, and/or other factors. In response to the difference exceeding the threshold, the process 480 proceeds to block 490. In response to the difference not exceeding the threshold, the process 480 returns to block 486 and receives the next input signal indicative of the particle exit speed.

At block 490, in response to the difference between the particle exit speed and the target particle exit speed exceeding the threshold value, an output signal indicative of instructions to adjust the belt speed of the particle belt is output to the motor configured to drive rotation of the particle belt (e.g., the motor configured to drive rotation of the wheel coupled to and configured to drive rotation of the particle belt). For example, the controller may output the output signal indicative of instructions to increase the belt speed of the particle belt in response to a determination that the particle exit speed is less than the target particle exit speed and the difference between the particle exit speed and the target particle exit speed exceeds the threshold value. Further, the controller may output the output signal indicative of instructions to decrease the belt speed of the particle belt in response to a determination that the particle exit speed is greater than the target particle exit speed and the difference between the particle exit speed and the target particle exit speed exceeds the threshold value. Additionally, the controller may output the output signal indicative of instructions to increase the flow rate of the air flow provided by the air flow system in response to the determination that the particle exit speed is less than the target particle exit speed and the difference between the particle exit speed and the target particle exit speed exceeds the threshold value, or the controller may output the output signal indicative of instructions to decrease the flow rate of the air flow provided by the air flow system in response to the determination that the particle exit speed is greater than the target particle exit speed and the difference between the particle exit speed and the target particle exit speed exceeds the threshold value.

In certain embodiments, the controller may determine whether the particle exit speed is within a first threshold value of the target particle transfer speed and whether the particle transfer speed is within a second threshold value of the target particle transfer speed. For example, in response to the difference between the particle exit speed and the target particle exit speed exceeding a first threshold value, the controller may perform a first control action, such as adjusting the belt speed of the particle belt. In response to the difference between the particle exit speed and the target particle exit speed exceeding a second threshold value smaller than the first threshold value (e.g., the second threshold value being a smaller range of the target particle exit speed, as compared to the first threshold value), the controller may perform a second control action (e.g., in addition to or in place of the first control action), such as adjusting the flow rate of the air flow provided by the air flow system.

After completing block 490, the process 480 returns to block 486 and receives the next input signal indicative of the particle exit speed of the particle at the particle exit section of the particle belt. The next determination is made of whether the difference between the particle exit speed and the target particle exit speed exceeds the threshold value (e.g., block 488), and the belt speed of the particle belt and/or the flow rate of the air flow may be adjusted in response to the determination. As such, blocks 486-490 of the process 480 may be iteratively performed (e.g., by the controller of the particle delivery system and/or by another suitable controller) to facilitate acceleration of the particles to the target particle exit speed. In some embodiments, certain blocks of the blocks 482-490 may be omitted from the process 480, and/or the order of the blocks 482-490 may be different.

Embodiments of a particle delivery system described herein may facilitate deposition of particles into a trench in soil. The particle delivery system may be configured to accelerate the particles downwardly toward and along the trench and to provide particular spacings between the particles along the trench. For example, the particle delivery system may include a particle disc configured to meter individual particles, thereby establishing a particular spacing between particles. The particle disc may be configured to release the particles from a release point of the particle disc. A first particle belt may be configured to receive the particles from the particle disc at a particle engagement section of the first particle belt. The first particle belt may be configured to transport the particles from the particle engagement section toward a particle exit section of the first particle belt. At the particle exit section of the first particle belt, the first particle belt may be configured to deliver and/or propel the particles toward a particle engagement section of a second particle belt. For example, the first particle belt may accelerate the particles to a speed greater than a speed resulting from gravitational acceleration alone. The second particle belt may be configured to receive the particles from the first particle belt at a particle engagement section of the second particle belt. The second particle belt may be configured to transport the particles from the particle engagement section toward a particle exit section of the second particle belt. At the particle exit section of the second particle belt, the second particle belt may be configured to deliver and/or propel the particles toward the trench in soil. The second particle belt may accelerate the particles to a speed greater than a speed resulting from gravitational acceleration alone.

The second particle belt may rotate faster than the first particle belt, such that the first particle belt and the second particle belt progressively accelerate the particles toward the trench. Additionally, the particle delivery system may include an air flow system that provides air flow(s) to accelerate the particles from the first particle belt toward the second particle and/or from the second particle belt toward the trench. In some embodiments, the particle delivery system may include guide wheels that accelerate the particles from the first particle belt toward the second particle belt. The first particle belt, the second particle belt, the air flow system, the guide wheels, or a combination thereof, may accelerate the particles such that the particle delivery system reduces the relative ground speed of the particles. As such, the first particle belt, the second particle belt, the air flow system, the guide wheels, or the combination thereof, may enable the row unit to travel faster than traditional row units that utilize seed tubes, which rely on gravity to accelerate the particles (e.g., seeds) for delivery to soil. For example, the particle delivery system may achieve higher application rates of the particles compared to traditional row units, thereby enabling the row unit having the particle delivery system to travel faster than traditional row units.

In certain embodiments, the particle exit section of the particle belt of the particle delivery system (e.g., a particle belt of the particle delivery system having one particle belt or a second particle belt of the particle delivery system having two particle belts) may extend generally parallel to the trench in soil, and the particle belt(s) of the particle delivery system may accelerate the particles, such that the particle exit speed of the particles generally matches the ground speed of the row unit. As such, the particles may be released at a velocity of zero relative to the trench (e.g., a horizontal component of the velocity), which may reduce rolling of the particles in the trench and facilitate placement of the particles with particular spacings between each particle.

Additionally, features of certain embodiments of the particle delivery systems described herein may be combined with features of other embodiments. For example, the particle transfer assembly of FIG. 3 (e.g., including the particle tube) and/or the particle transfer assembly of FIG. 4 (e.g., including the guide wheels) may be included in the particle delivery systems of FIGS. 7 and 8. In certain embodiments, the air flow provided by the air flow system of FIG. 8 that accelerates the particles from the particle exit section of the second particle belt to the trench may be included in the particle delivery systems of FIGS. 3 and 4. In some embodiments, the particle belt having the particle exit section of FIGS. 7 and 8 extending generally parallel to the trench and/or the particle belt having the particle engagement section of FIGS. 7 and 8 extending at an angle relative to the particle of section may be included in the particle delivery systems of FIGS. 3 and 4. Additionally or alternatively, the embodiments of the particle delivery systems described herein, or portions thereof, may be combined in other suitable manners.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particle delivery system of an agricultural row unit, comprising:
    a first particle belt configured to receive a particle from a particle metering and singulation unit;
    a second particle belt comprising a particle engagement section configured to receive the particle from the first particle belt and a particle exit section to expel the particle to a trench in soil;
    a particle transfer assembly configured to facilitate transfer of the particle from the first particle belt to the particle engagement section of the second particle belt; and
    a controller comprising a memory and a processor, wherein the controller is configured to:
        receive an input signal indicative of a particle transfer speed of the particle at the particle engagement section of the second particle belt; and
        output an output signal indicative of instructions to adjust a belt speed of the first particle belt, such that the particle transfer speed reaches a target particle transfer speed.

2. The particle delivery system of claim 1, wherein the controller is configured to determine the target particle transfer speed based on a type of the particle, a ground speed of the agricultural row unit, a spacing between opposing flights of the first particle belt, a spacing between opposing flights of the second particle belt, a belt speed of the second particle belt, or a combination thereof.

3. The particle delivery system of claim 1, wherein the controller is configured to:
    output the output signal indicative of instructions to increase the belt speed of the first particle belt in response to determining that the particle transfer speed is less than the target particle transfer speed and a difference between the particle transfer speed and the target particle transfer speed exceeds a threshold value; and
    output the output signal indicative of instructions to decrease the belt speed of the first particle belt in response to determining that the particle transfer speed is greater than the target particle transfer speed and the difference between the particle transfer speed and the target particle transfer speed exceeds the threshold value.

4. The particle delivery system of claim 1, wherein the particle transfer assembly comprises a particle tube configured to at least partially direct the particle from the first particle belt to the particle engagement section of the second particle belt.

5. The particle delivery system of claim 1, wherein the particle transfer assembly is configured to accelerate the particle between the first particle belt and the particle engagement section of the second particle belt, and the controller is configured to output a second output signal indicative of instructions to control operation of the particle transfer assembly, such that the first particle belt and the particle transfer assembly accelerate the particle to the target particle transfer speed.

6. The particle delivery system of claim 5, comprising an air flow system configured to provide an air flow to accelerate the particle from the first particle belt to the particle engagement section of the second particle belt, and the second output signal is indicative of instructions to control a flow rate of the air flow provided by the air flow system.

7. The particle delivery system of claim 5, wherein the particle transfer assembly comprises at least one guide wheel configured to guide the particle from the first particle belt to the particle engagement section of the second particle belt via rotation of the at least one guide wheel, and the second output signal is indicative of instructions to control a rotation rate of the at least one guide wheel.

8. A particle delivery system of an agricultural row unit, comprising:
    a first particle belt configured to receive a particle from a particle metering and singulation unit;
    a second particle belt comprising a particle engagement section configured to receive the particle from the first particle belt and a particle exit section to expel the particle to a trench in soil;
    a particle transfer assembly configured to facilitate transfer of the particle from the first particle belt to the particle engagement section of the second particle belt; and
    a controller comprising a memory and a processor, wherein the controller is configured to:
        receive an input signal indicative of a particle exit speed of the particle at the particle exit section of the second particle belt; and
        output an output signal indicative of instructions to adjust a belt speed of the second particle belt, such that the particle exit speed reaches a target particle exit speed.

9. The particle delivery system of claim 8, wherein the controller is configured to:
    output the output signal indicative of instructions to increase the belt speed of the second particle belt in response to determining that the particle exit speed is less than the target particle exit speed and a difference between the particle exit speed and the target particle exit speed exceeds a threshold value; and
    output the output signal indicative of instructions to decrease the belt speed of the second particle belt in response to determining that the particle exit speed is greater than the target particle exit speed and the difference between the particle exit speed and the target particle exit speed exceeds the threshold value.

10. The particle delivery system of claim 8, wherein the controller is configured to determine the target particle exit speed based on a type of the particle, a ground speed of the agricultural row unit, a spacing between opposing flights of the first particle belt, a spacing between opposing flights of the second particle belt, or a combination thereof.

11. The particle delivery system of claim 8, wherein the particle transfer assembly comprises a pair of guide wheels configured to rotate in opposite directions to guide the particle between the pair of guide wheels from the first particle belt to the particle engagement section of the second particle belt.

12. The particle delivery system of claim 11, wherein the controller is configured to:
    receive an input signal indicative of a particle transfer speed of the particle at the particle engagement section of the second particle belt; and
    output an output signal indicative of instructions to adjust a belt speed of the first particle belt, a rotation rate of the pair of guide wheels, or both, such that the particle transfer speed reaches a target particle transfer speed.

* * * * *